United States Patent [19]
Jones et al.

[11] Patent Number: 5,193,110
[45] Date of Patent: Mar. 9, 1993

[54] INTEGRATED SERVICES PLATFORM FOR TELEPHONE COMMUNICATION SYSTEM

[75] Inventors: Scott A. Jones, Prides Crossing; Allen T. Arumainayagam, Malden; Amitava Mukherjee, Boston; Donald F. Picard, Medford; Richard E. Cohen, Somerville, all of Mass.

[73] Assignee: Boston Technology, Incorporated, Wakefield, Mass.

[21] Appl. No.: 594,648

[22] Filed: Oct. 9, 1990

[51] Int. Cl.$^5$ ............... H04M 11/00; H04M 1/64; H04M 3/42; H04M 7/00; H04T 3/12
[52] U.S. Cl. ............... 379/94; 379/88; 379/89; 379/93; 379/100; 379/201; 379/233; 370/110.1
[58] Field of Search ............... 379/67, 88, 89, 100, 379/93, 94, 201, 211, 233; 370/110.1

[56] References Cited

U.S. PATENT DOCUMENTS

| | | | |
|---|---|---|---|
| 4,400,587 | 8/1983 | Taylor et al. | 179/27 |
| 4,521,933 | 9/1980 | Cornell et al. | 379/89 X |
| 4,612,416 | 9/1986 | Emerson et al. | 379/88 |
| 4,713,837 | 12/1987 | Gordon | 379/93 |
| 4,761,807 | 8/1988 | Matthews et al. | 379/89 |
| 4,763,317 | 8/1988 | Lehman et al. | 370/58.1 |
| 4,837,798 | 6/1989 | Cohen et al. | 379/88 |
| 4,918,722 | 4/1990 | Duehren et al. | 379/100 |
| 4,932,042 | 6/1990 | Baral et al. | 379/89 |
| 4,933,967 | 6/1990 | Lo et al. | 379/207 |
| 4,935,954 | 6/1990 | Thompson et al. | 379/89 |
| 4,955,054 | 9/1990 | Boyd, Jr. et al. | 379/267 |
| 4,972,462 | 11/1990 | Shibata | 379/89 |
| 4,995,073 | 2/1991 | Okata et al. | 379/100 X |
| 4,996,707 | 2/1991 | O'Malley et al. | 379/100 |
| 5,029,199 | 7/1991 | Jones et al. | 379/89 |
| 5,062,133 | 10/1991 | Melrose | 379/201 X |

FOREIGN PATENT DOCUMENTS

| | | | |
|---|---|---|---|
| 0237834 | 9/1987 | European Pat. Off. | 379/201 X |
| 0309993 | 4/1989 | European Pat. Off. | 379/89 |

OTHER PUBLICATIONS

Electrical Communication, vol. 47, No. 3, 1972, "Central Control Philosophy for the Metaconta L Switching System", by S. Kobus et al., pp. 159–163.
IEEE Transactions on Communications, vol. 30, No. 1, Jan. 1982, "A Design Model for a Real-Time Voice Storage System", by Shimmi Hattori et al., pp. 53–57.
WO-A-8 808 654 (American Telephone & Telegraph).
Reprinted from Telephony, Oct. 9, 1989, "Hop on the Enhanced Services Express", by Scott A. Jones and Greg C. Carr.
"PSI Rolling Out Multiple Platform", pp. 2–3.
"Network Applications Platform (Quickly Add New Services to Your Existing Networks)", UNISYS.
"Voice Messaging Applications (Easily Add Residential and Business Voice Messaging to Your Network)".
"Network Applications Platform/Open", UNISYS.
"Network Applications Platform (Technical Summary)", UNISYS.

Primary Examiner—James L. Dwyer
Assistant Examiner—Harry S. Hong
Attorney, Agent, or Firm—Staas & Halsey

[57] ABSTRACT

An integrated services platform for a telephone communication system includes a plurality of application processing ports for providing different types of information services through the telephone communication system. A master control unit and a high speed digital switch control processing of incoming phone calls to recognize the type of service being requested by a subscriber and non-subscriber, and route the call to the appropriate application processing port which is capable of providing the requested service. Application processing ports can be provided to implement a number of information services including videotex, voice, speech synthesis, E-mail, facsimile store and forward, speech recognition, telex, residential call answering, business voice messaging, home shopping, classified advertising, trucking dispatch, doctor's register and automated attendant. In this manner, a centrally located services platform can be provided to provide a number of different types of service to the user.

19 Claims, 16 Drawing Sheets

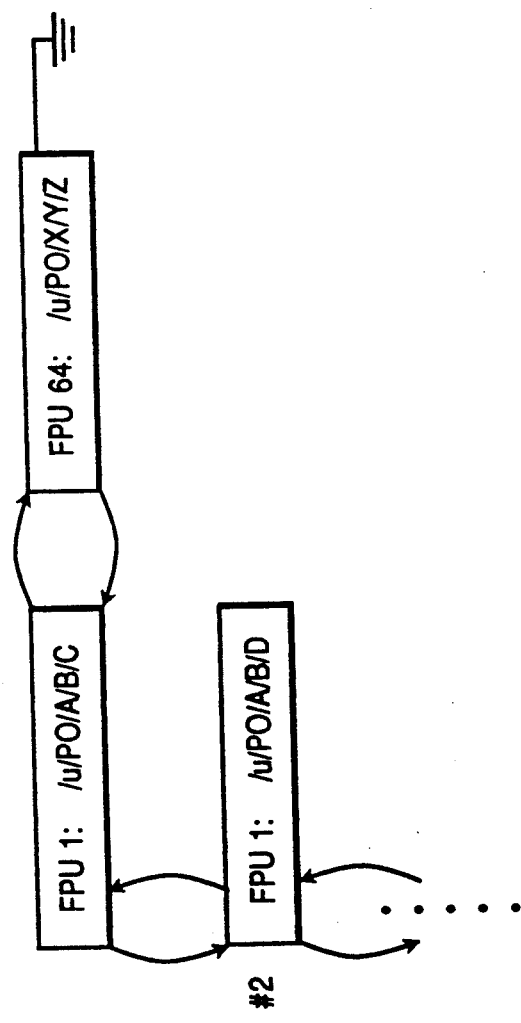

INTEGRATED SERVICES PLATFORM FOR TELEPHONE COMMUNICATION SYSTEM

CROSS REFERENCE TO RELATED APPLICATION

This application is related to U.S. application Ser. No. 393,270, filed Aug. 10, 1989, now U.S. Pat. No. 5,029,199, which is assigned to the assignee of the subject application.

BACKGROUND OF THE INVENTION

1. Field of the Invention

The present invention relates to an integrated services platform for a telephone communication system, which handles a plurality of information services, including a voice mail message service and a facsimile processing service, and more particularly, to such a platform which provides a tightly coupled distributed architecture that allows substantially increased efficiency of equipment utilization, increased subscriber capability, modular expansion capability and low access blockage for subscribers and non-subscribers.

2. Description of the Related Art

There are available a number of telephone communication systems for offering a single type of information service to users. For example, copending U.S. application Ser. No. 393,270, filed Aug. 10, 1989 by Jones et al. discloses a voice mail message system having multiple voice processing units which are used to process a high volume of calls, so as to provide a high quality voice mail messaging service to a large number of subscribers.

U.S. Pat. No. 4,918,722 to Duehren et al. discloses a method for sending a facsimile message from a first location to a remote location accessible from the first location via the public switched telephone system.

While there are a number of existing communication systems which are capable of providing a single type of information service, there is a need for a telephone communication system which is capable of integrating a plurality of different types of information services on a single platform and which is also capable of adding new types of information services as they become available. In particular, there is a need for a telephone communication system which is capable of providing both a voice mail message service and a facsimile processing service which are integrated on a single platform.

SUMMARY OF THE INVENTION

It is an object of the present invention to provide an integrated services platform for a telephone communication system which is capable of integrating a plurality of different types of information services on a single platform, and which is also capable of adding new types of information services as they become requested by potential users, or as they become available.

In particular, it is an object of the present invention to provide an integrated services platform for a telephone communication system which provides a voice mail message service and a facsimile processing service on a single platform.

It is a further object of the present invention to provide an integrated services platform having a modular expansion capability, so that additional information services such as videotex, speech synthesis, E-mail, speech recognition and telex may be added to an existing platform having a voice mail message service and a facsimile processing service.

The above objects can be accomplished by an information communication system which includes a processing system having at least first and second application processing ports for providing first and second types of information services, respectively, to a user. The first and second information services are of different types, for example, the first may be a voice mail message service, while the second is a facsimile processing service. A switching and control system selects one of the first and second application processing ports in response to a request for one of the types of information services, and connects the user to the selected one of the application processing ports. The selected application processing port provides the requested information service in response to the user's request.

The present invention is specifically designed for use with a telephone company central office or for a very large corporate user. In addition, the high capacity nature of the present invention will allow entire metropolitan areas to be served by the present invention. However, an exchange such as a private business exchange can take advantage of the high availability characteristics of the present invention in situations where there are a large number of information service requests, such as telephone shopping. Thus, the present invention serves as an adjunct to current switching technology in public and private switched networks. The distributed architecture used in the invention allows the system to be configured presently up to a total of 1536 ports which may be broken down into any desired arrangement of service channels such as voice channels, fax channels, videotex channels, telex channels, E-mail channels, etc. The system will provide service for approximately 100,000 subscribers (including e.g., voice mailboxes, fax mailboxes, videotex mailboxes, etc.) in a mixture of available service capacity which is equivalent to approximately 70 gigabytes of storage. The architecture allows the present invention to simultaneously run multiple applications while keeping the underlying system totally transparent to the end user. The caller and/or subscriber can send, reply to, or redirect information at will, irrespective of which application processing port stores particular information or which application processing port is handling a call.

The various computer programs executed within the distributed architecture are preferably written in the "C" programming language or Intel 386 assembly language. Each processor in the distributed architecture preferably employs an operating system such as Xenix or Unix system V, which allows multiple real time tasks. In this connection, any operating system can provide an environment where the low level device drivers can encapsulate the necessary real time capabilities if the operating system itself does not provide them.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 16 is a diagram for illustrating how messages are stored; and

FIG. 17 is a diagram for illustrating a doubly linked list used to output messages to a subscriber.

DESCRIPTION OF THE PREFERRED EMBODIMENT

The present invention is an enhancement of the telephone communication system disclosed in copending U.S. application Ser. No. 07/393,270, filed Aug. 10, 1989, the contents of which are hereby incorporated by a reference.

Figure 1:
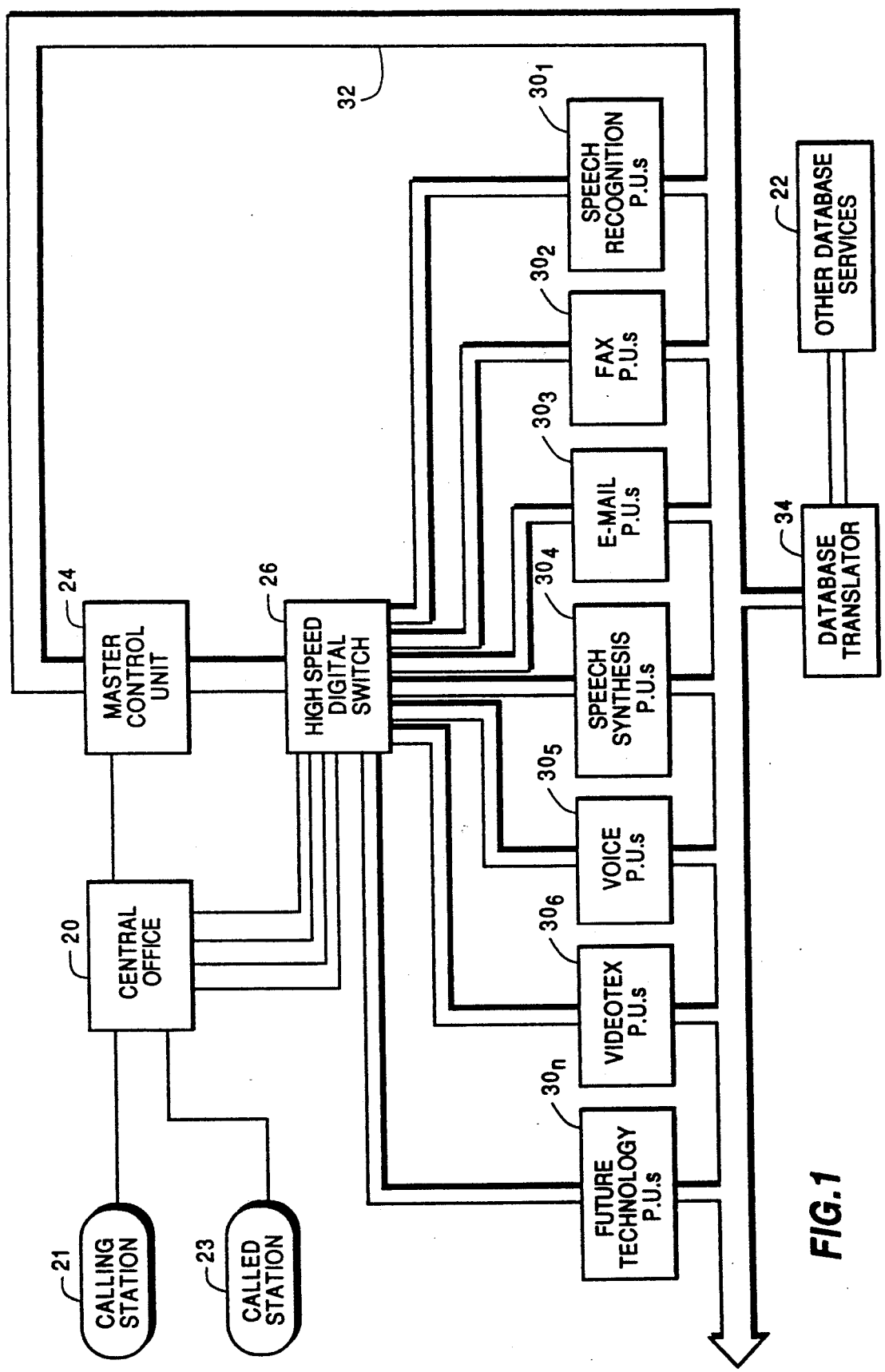
FIG. 1 is a block diagram of an integrated services platform for a telephone communication system in accordance with the present invention, with illustration of the connection to a central office of a telephone company.

FIG. 1 is a block diagram of an integrated services platform for a telephone communication system in accordance with the present invention. The integrated services platform is illustrated as being connected to a central office 20 and optionally to other database services 22 running one or more computers (e.g., mainframes, mini-computers and personal computers). While FIG. 1 illustrates a central office 20, in practice, this could be any portion of the public telephone switching network. That is, while a calling station 21 and a called station 23 are illustrated as being connected to the central office 20, more typically, the calling station 21 will be connected to a different central office in the public telephone switching network.

The integrated services platform includes a master control unit 24 and a digital switching system or digital switch 26, both of which are connected to the central office 20. The master control unit 24 is formed by one or more computers which are capable of communicating over the telephone network to provide traffic reporting and remote administration (e.g., Engineering and Administrative Data Acquisition Systems (EADAS)—performance data, traffic data, reporting options, Automatic Traffic Statistics (ATS)), call routing information (e.g., SMDI or SS7), service order generation, alarming (e.g., Service Control Center System (SCCS), remote maintenance, diagnostics) and billing (e.g., Automated Message Accounting (AMA) billing, call detail records, transmission options). The digital switch 26 is coupled to the central office 20 by a transmission medium such as T-1 or (Integrated Services Digital Network (ISDN) Primary Rate Interface (PRI). The digital switch 26 is coupled to a multiplicity of application processors $30_1$ to $30_n$ which are specially adapted to provide the various information services under the control of the platform. Thus, in the context of the subject application, the term "information services" is meant to include any type of service which may be carried over a telephone communication link (e.g., a standard telephone wire, fiber optic line or radio communication).

In FIG. 1, application processor $30_1$ includes one or more speech recognition processing units, application processor $30_2$ includes one or more facsimile processing units, application processor $30_3$ includes one or more E-mail processing units, application processor $30_4$ includes one or more speech synthesis processing units, application processor $30_5$ includes one or more voice processing units, and application processor $30_6$ includes one or more videotex processing units. The application processors $30_1$ to $30_n$ are coupled to the master control unit 24 via an internal data bus 32. Assignment of an incoming request for service (e.g., a call from a calling station 21 to a called station 23) by the master control unit 24 to an application processing unit (APU) in one of the application processors $30_1$ to $30_n$, occurs over the internal bus or network 32 which includes both a data bus and an information bus. The bus 32, rather than being a traditional bus, can be a network of any topology such as a star or token ring. Control data and messages between the MCU 24 and the APUs or between the APUs, is routed over the data bus of the internal bus 32, while requested information services are routed between the APUs over the information bus of the internal data bus 32. It is preferred that the internal bus 32 be a standard bus such as is provided by an Ethernet. The information and data logical buses can be implemented as a single physical bus over the Ethernet or as separate Ethernets when interprocessor service or data communication is high. Thus, each of the APUs acts as a processing means for providing a specified type of information service to a user. The master control unit 24 and high speed digital switch 26 operate as switching and control means for selecting one of the APUs in response to the requested information service and for connecting the user to the selected APU so that the selected APU can provide the requested information service to the user. Of course, it is not necessary that each of the application processors $30_1$–$30_n$ or even each of the application processing units be devoted to providing a single type of information service. That is, each application processing unit could be programmed to provide multiple information services, with a specified information service being assigned to a predetermined port on the application processing unit.

The integrated services platform in accordance with the present invention can also include a database translator 34 which provides for connection between the platform and one or more other database services 22 which desire to provide their services via the central office 20. Alternatively, the database translator 34 may be omitted and the other database services 22 may be connected directly to the bus 32.

Figure 2:
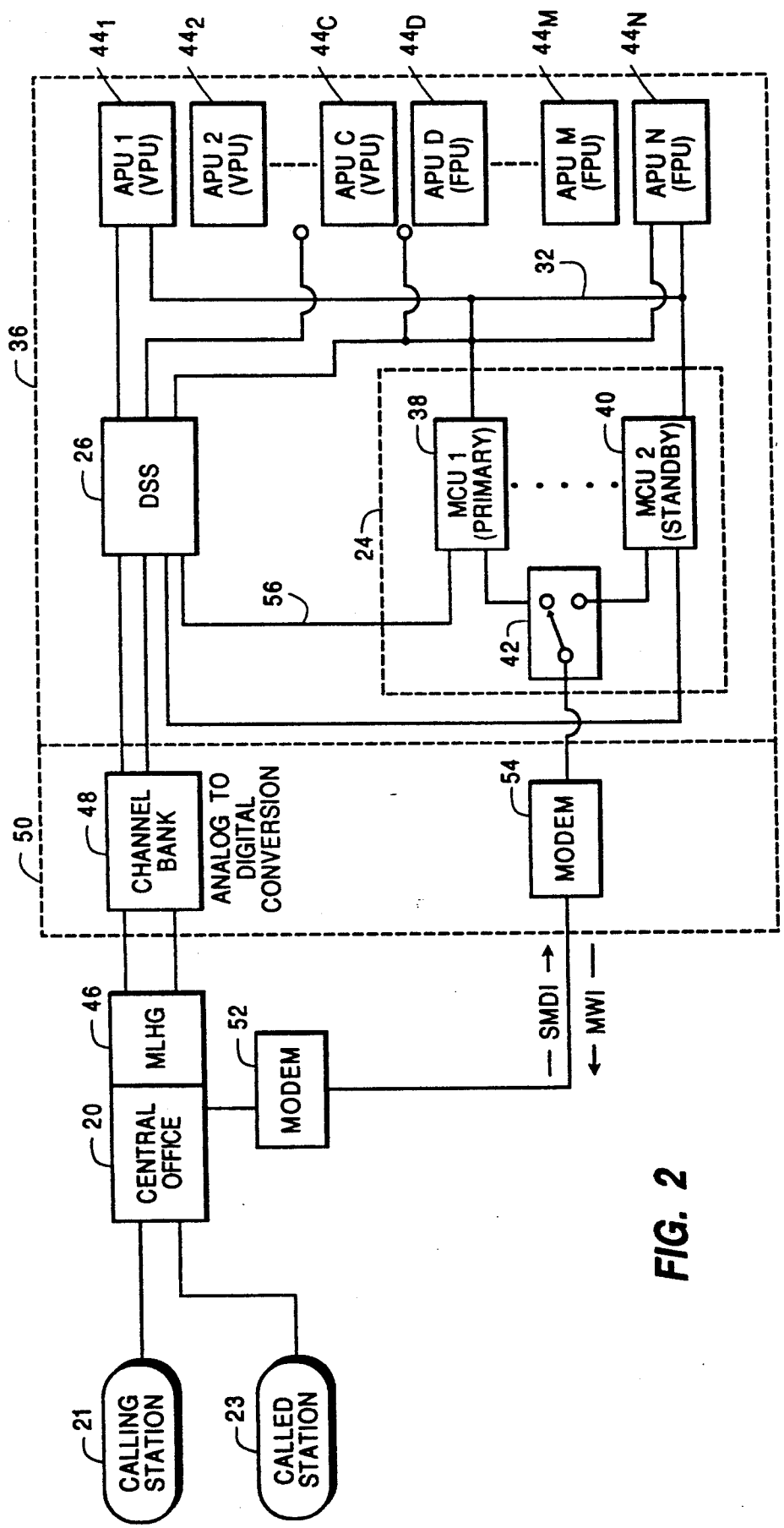
FIG. 2 is a block diagram of an embodiment of the integrated services platform in accordance with the present invention, wherein plural voice processing units and plural facsimile processing units are used as the application processing units.

FIG. 2 is a block diagram of a specific implementation of an integrated services platform 36 in accordance with the present invention, which is capable of providing both an audio information service (i.e., a voice mail message service) and a data information service (i.e., a facsimile processing service). In the integrated services platform 36 of FIG. 2, the master control unit 24 includes a primary master control unit (MCU) 38 and a standby master control unit (MCU) 40 which control switching by the digital switching system 26. The master control unit 24 also includes a switch 42 which is controlled to actuate either the primary MCU 38 or the standby MCU 40. The primary MCU 38 typically coordinates the routing of service requests (e.g., calls), based on conventional Simplified Message Desk Interface (SMDI) information packets from the central office 20, through the digital switching system 26 to application processing units $44_1, 44_2, 44_3 \ldots 44_L, 44_M, 44_N$. However, the called number may be received in a number of different formats in different ways, for example, in-band protocols such as direct inward dialing (DID) may be used. For example, the MCU 38 may receive routing information based on the DID line digits collected by a voice application fax card in the APU which would then notify the MCU.

The number of application processing units 44 which can be provided on the platform 36 will vary depending on the type of services offered. In the FIG. 2 embodiment, a combination of voice processing units (application processing units $44_1$–$44_C$) and facsimile processing units (application processing units $44_D$–$44_N$) are employed in some combination. For example, depending on the service requirements, the platform 36 could include 75% VPUs and 25% FPUs. As an option, each of the APUs 44 may provide both types of information services, so that each APU 44 would be a combined VPU/FPU have specified ports assigned to voice messaging and facsimile processing.

Assignment of an incoming call by the MCU 24 to an APU occurs over the internal bus or network 32 that includes both the control data bus and the information bus. Control data and messages between the MCU 24 and the APUs, or between the APUs, is routed over the control data bus of the internal bus 32, while the service information is routed between the APUs over the information bus of the internal bus 32.

It is preferred that the digital switching system 26 be connected to one or more central offices 70 through one or more multi-line hunt groups (MLHG) 46. It is also preferred that a digital central office 20 be used so that digital voice samples can be passed between the central office 20 and the digital switching system 26. However, if the central office 20 is an older switch, such as an AT&T 1A-ESS, an optional telephone network interface circuit 50, including a channel bank 48, can be provided for converting incoming analog signals to digital packets. Communications between the MCU 24 and the central office 20 may be via conventional serial modems 52 and 54, preferably using the SMDI communication format. Alternatively, other formats such as in-band automatic number identification (ANI) protocols (e.g., DID or MF signalling) or any proprietary or public protocol used by PBXs can be used.

During operation, when a subscriber or non-subscriber at a calling station 21 calls a subscriber at a called station 23, the call is switched normally through the central office 20, so that a ringing signal is sent to the called station 23 and a ring back tone is returned to the calling station 21. After a predetermined number of rings (for example 5) or immediately if the line is busy, the call is forwarded to the multi-line hunt group 46 by the central office 20. When the central office 20 determines that a line is available, the central office 20 causes the group 46 to ring one of the ports of the digital switching system 26. If a line is available to the digital switching system 26, a message packet, preferably in SMDI format, is sent from the message desk of the central office 20 to MCU 24 through modems 52 and 54. The packet contains the message desk identification number, the trunk ID indicating which port of the digital switching system 26 will receive the call, the called number and the calling number.

In the present invention, although other options are possible, the called number acts as an information mailbox address (for example, for a voice mailbox or a fax mailbox) and of course, a translation can occur between the called telephone number and the mailbox address. The central office 20, after transmitting the SMDI packet, places the call on the designated port of the digital switching system 26. The digital switching system 26, when it receives the call, informs the MCU 24 of a call arrival via link 56 and indicates on which port the call has arrived. The MCU 24, if a packet arrives prior to a call at the digital switching system 26, waits for a predetermined time, for example 12 seconds, and if the call does not arrive at the digital switching system 26, discards the packet. If a call arrives at the digital switching system 26 without the packet arriving within 6 seconds (an atypical situation) the call is assigned to the first available VPU and the digital switching system 26 is switched accordingly. The VPU makes a request for the mailbox number, receives the number from the caller (unless the caller is a fax machine) and provides the number to the MCU 38 in a simulated SMDI packet. A similar procedure can be employed if the called number is for a DID line.

If a matching SMDI packet and call port on the digital switching system 26 arrive, or after a telephone number has been entered, the MCU 24 accesses the mailbox data base and determines whether the requested mailbox is a voice mail mailbox, a fax mailbox or some other type of information mailbox. If it is determined that a fax mailbox is requested, processing is carried out in the manner described in detail later in this application. If a voice mailbox is requested, the MCU 24 determines which of the VPUs is the "home" VPU and, if the home VPU is available, the MCU 38 instructs the digital switching system over the link 56 to route the call to the home VPU (e.g., APU $44_1$). A conventional T1 channel (time slot) to channel (time slot) connection command is provided to the digital switching system 26 from the MCU 24 to effect the routing desired.

The routing of calls to "home" or "remote" VPUs to process and store voice mail messages is described in detail in copending application Ser. No. 07/393,270, filed Aug. 10, 1989 and will not be repeated here. This copending application also describes in detail the transmission of voice mail messages to the subscriber. Further, FIG. 2 of this copending application describes in detail the components that allow communication between the MCU 24 and the central office 20.

Figure 3:
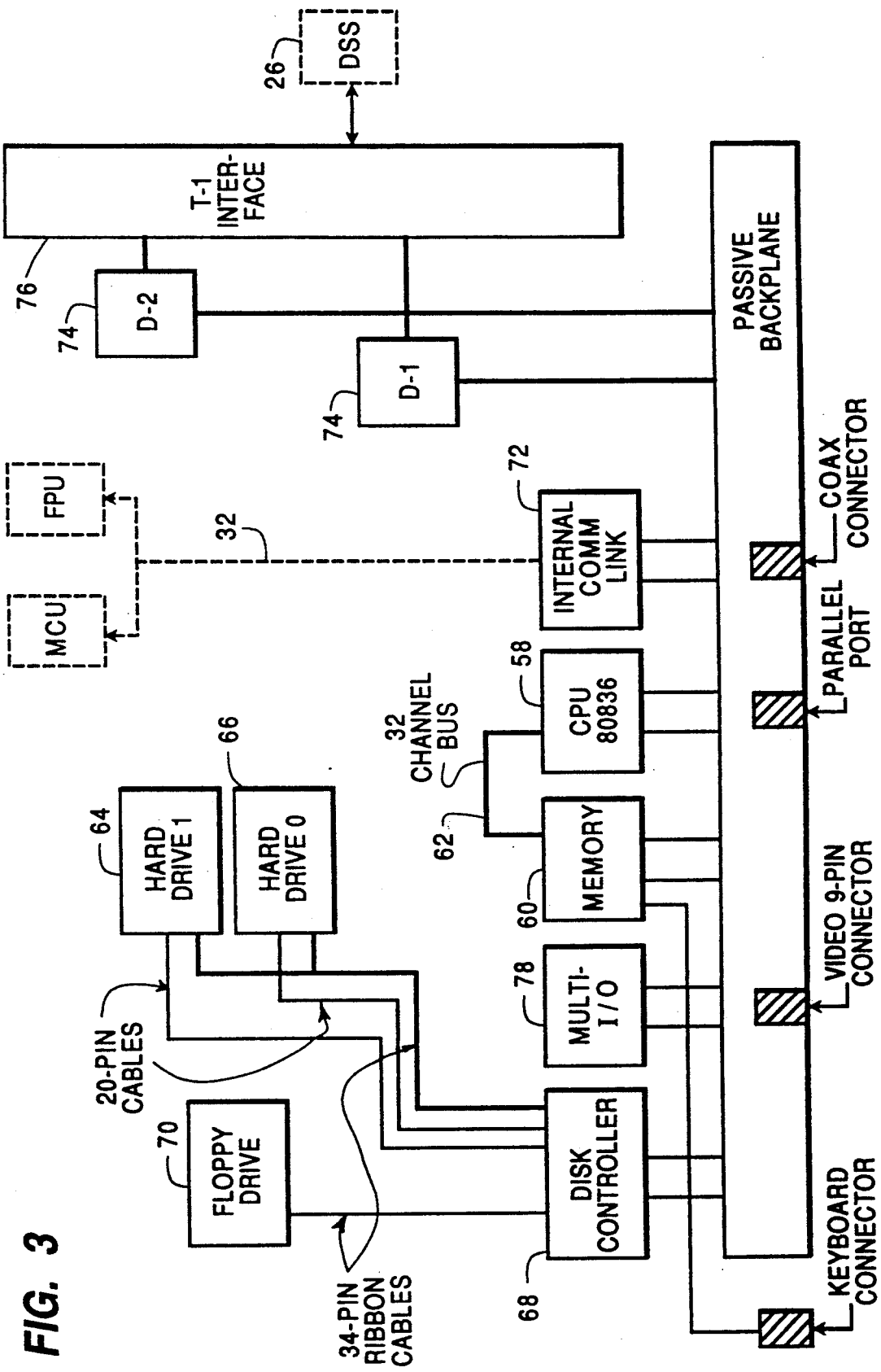
FIG. 3 is a block diagram of the components of a facsimile processing unit.

Each facsimile processing unit (FPU) includes the components illustrated in FIG. 3. Each FPU is essentially an IBM AT type computer with special communications cards mounted on the back plane. A CPU 58 is based on the Intel 80386 processor and an appropriate unit is available from Sigma Design of Freemont, Calif. as Model No. CPA3820BACX. The CPU 58 stores temporary data structures, messages, and the FPU control programs to be executed, in a memory unit 60 configured for 8 megabytes of random access memory. A suitable memory unit 58 is available from Sigma Design of Freemont, California as Model No. CMA380K00N, while the memory chips for the unit can be obtained from Centon of Wilmington, Mass. The CPU 58 has direct access to the memory 60 via a conventional 32 channel bus 62. Facsimile messages are stored on two hard disk drives 64 and 66, each having a 760 megabyte storage capability which is equivalent to approximately 12,000 pages of fax. Alternatively, the hard disk drive may have a 380 megabyte storage capability which stores approximately 5600 pages of fax. The hard disk drives 64 and 66 can store different information to extend storage capability or they can store the same facsimile information and other information using a technique conventionally called mirror image storage. This operation is controlled by a disk controller 68. The hard disk drives 64 and 66 are available from Anthem of Wilmington, Mass. as Maxtor Model No. XT8760E, while the disk controller 68 is available from DPT of Maitland, Fla. as Model PM301/75. A floppy disk drive 70, which is preferably a Fujitsu Model M2553K03A is used for loading the system initially and for any maintenance modifications that need to be performed. The MCU 38 and other FPUs are connected to the FPU of FIG. 3 through a conventional Ethernet internal communications link 72 which is available from Excelan of Nashuau, N.H. as Model No. 9900615-01. The internal communication link 72 can be either two physical Ethernets or a single Ethernet with two logical buses thereon. If two physical Ethernets are used, two internal communication links 72 must be provided.

The communication between the CPU 58 and the digital switching system 26 is through digital ports 74 to a conventional T1 interface 76, and thereafter to the digital switching system 26. The T1 interface 76 is available from Dialogic of Parsippany, N.J. as Model No. T1DT1124. The port line cards of the digital ports 74 are two port facsimile line cards which are available from Brooktrout Technology, Inc. as Model No. TR 112LL, with the protocol for communication with these line cards being specified by the available Hardware Guide for the cards. It should be noted that regardless of the type of facsimile line card used, the software described later in this application is layered in such a way that only the underlined library functions and the device driver shall require any changes if the line card is changed. In the near future, 12 port facsimile line cards should be available which will allow two services (e.g., voice and fax) to be run on the same CPU. The line cards 74 have the internal capability of detecting a call by a facsimile machine, handling the industry standard facsimile protocol in accordance with CCITT Group III standards, monitoring on and off hook conditions and going on-hook and off-hook.

The application process for the FPU interfaces to the line cards using linked library routines that make system calls to facsimile line card driver routines. A multi-IO unit 78 provides an interface for a video display whenever maintenance of the FPU is necessary.

Each of the master control units 38 and 40 is essentially an IBM AT based machine as previously discussed with respect to the FPUs of FIG. 3. The MCUs are described in detail with reference to FIG. 5 of copending application Ser. No. 07/393,270, filed Aug. 10, 1989.

Figure 4:
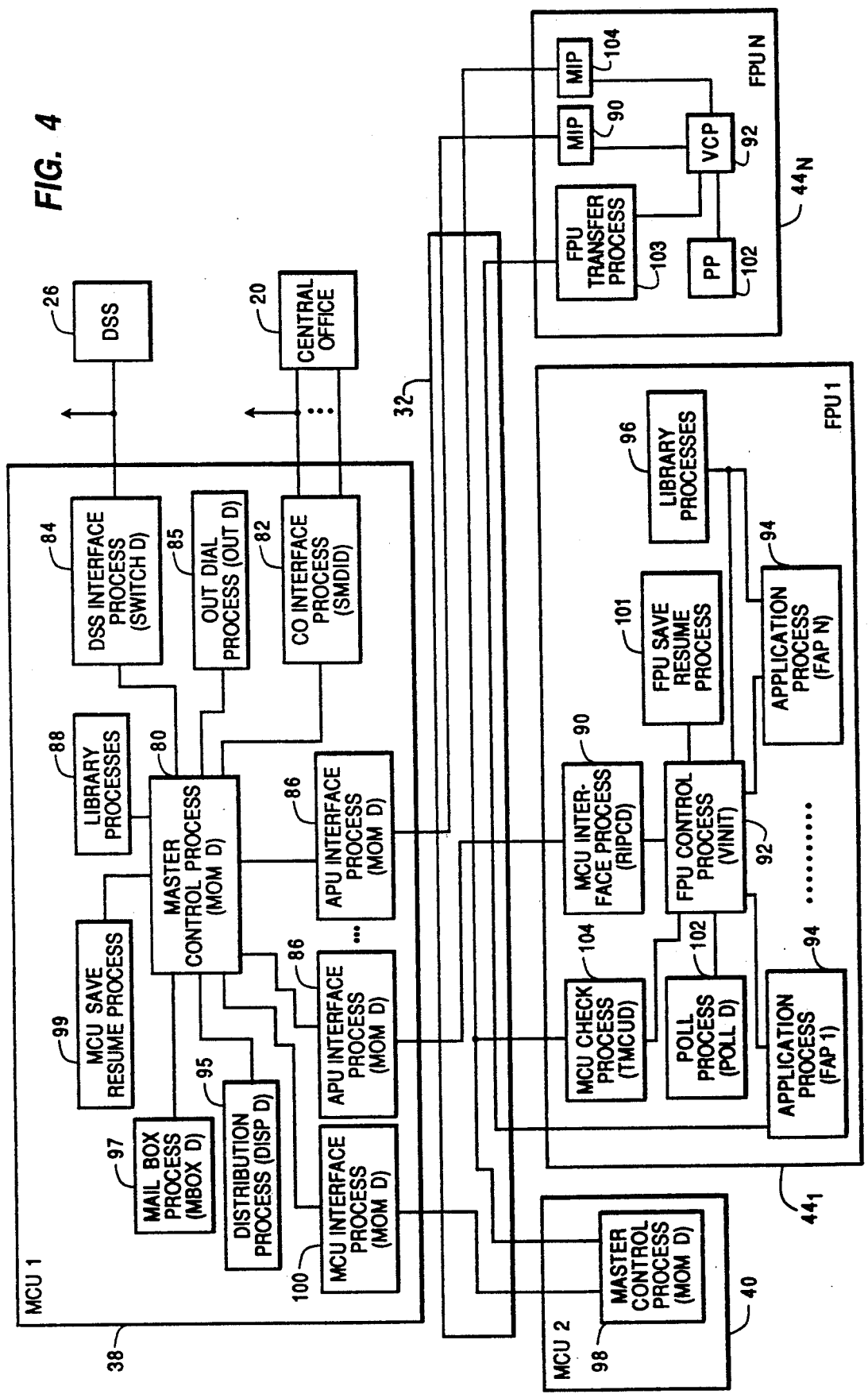
FIG. 4 is a flow diagram for illustrating the processes executed under the control of the master control unit and the flow of messages and data.

During call processing, the processes illustrated in the flow diagram of FIG. 4 are executed by the various processing units previously discussed. The processes illustrated in FIG. 4 are represented using descriptive names and program acronyms. For example, a master control process 80 has the acronym MOMD. For the most part, the acronyms refer to the corresponding "C" programming language processes or similar processes which are listed in the appendix attached to copending application Ser. No. 07/393,270, filed Aug. 10, 1989. The variations in the processes which result from the integration of other information services on the platform (e.g., implementation of the facsimile information service) are discussed later in this application in conjunction with the flow diagrams of drawing FIGS. 5 to 15. FIG. 4 illustrates the connection of the facsimile application processes to the master control process. Of course, the master control process is also connected to the voice mail message applications process. However, since the cooperation between the VPUs and the master control unit is already described in detail in the copending application, this detailed description will not be repeated here.

Referring to FIG. 4, in the preferred embodiment, when SMDI information from the central office arrives over one of eight RS232-1200 baud central office lines, a central office interface process 82 examines the information and places an appropriate message in a message buffer for the master control process 80. At the same time, a call arrival (service request) packet arrives from the digital switching system 26 through a digital switching system interface process 84 to the master control process 80. The master control process 80 coordinates the two packets (call arrival and SMDI) through the referenced channel in each packet. If the master control process 80 receives an SMDI packet without receiving a call arrival packet within 12 seconds, it discards the SMDI packet. If the master control process 80 gets a call arrival packet without an SMDI packet arriving within 6 seconds, the master control process 80 places the call on the least busy VPU without SMDI information.

The master control process 80, as previously discussed, determines how to route the call through the switch 26 and transmits that information to the digital switching system interface process 82 which provides an appropriate channel assignment to the digital switching system 26. This channel assignment is entered on a list in the MCU and includes port assignments for the APUs. In general, as with the voice mail application described in the copending application, each subscriber is assigned a "home" FPU and the MCU typically causes the digital switching system 26 to connect to the subscriber's home FPU. However, in the event the FPU is blocked (i.e., all ports on the subscriber's home FPU are busy), the call is switched to a non-busy FPU. The subscriber's personal data, such as a greeting/name announcement, is transferred via the bus 32 to the selected non-busy FPU. In the same manner, a facsimile document will be made available to a subscriber who is not logged into their home FPU. All physical addresses of facsimile documents and voice messages are stored by the MCU. Thus, when the subscriber calls in to retrieve his facsimiles or voice messages, each will be retrieved and presented in the order it was received.

Based on the selection of the facsimile processing unit, the master control process 80 provides a copy of the SMDI packet and the call routing information t a corresponding one of plural APU interface processes 86. The APU interface processes 86 are respectively coupled to the application processing units 44. Therefore, certain of the APU interface processes 86 are connected to FPUs while other APU interface processes are connected to VPUs.

Each interface process described herein essentially translates an information packet from one protocol to another protocol, thereby allowing processes with different message formats to interact. Each interface process also calls appropriate driver processes through library processes 88. The driver routines are conventional routines which can be obtained from the equipment manufacturer or which can be produced readily by one of ordinary skill in the art. The APU interface process 86 for each one of the APUs 44 (in FIG. 4 only FPUs are illustrated in detail), is connected to the master control process 80. This process is a connection oriented process or virtual link process, rather than a packet oriented process. In a virtual link process, the process will terminate if the connection to the designated APU fails. This process is automatically supported by the TCP/IP protocol executed by the processes provided by the net card manufacturers. If an interface process terminates, the master control process 80 is informed by the operating system and changes the status of the corresponding APU from available to unavailable. The master control process 80 then periodically tries to restart the interface process as long as the system configuration information indicates the APU should be on line and active. When the interface process successfully executes, the APU is back on line and the status is changed to available. An appropriate connection protocol and process is available from Excelan.

The APU interface process 86 translates buffer messages from the operating system format (e.g., Xenix) to the format of the Ethernet internal bus 32. The information is transmitted to the appropriate APU over the bus 32 to an MCU interface process 90 in the appropriate APU. The routing of the messages to the appropriate APU or MCU process is automatically handled by the TCP/IP protocol using, for example, device or process addresses. The MCU interface process 90 translates the message into the operating system message format of the APU and, in a case where the APU is an FPU, provides it to the FPU control process 92. Application processes 94 which in this case are facsimile application processes, are described in detail later in this application. In general, when an application process 94 detects an incoming call, the process 94 requests that the FPU control process 92 provide a call information packet including the incoming port and the SMDI packet. When the application process 94 detects a ringing call, it asks the FPU control process 92 if there is any SMDI packet waiting for an FPU port. If so, the FPU control process 92 forwards the packet. If not, the application process 94 will wait up to 5 seconds for a packet to arrive, and if it does not arrive, the process 94 causes an error signal to be generated. The FPU control process 92 provides the message to the application process 94 which controls the communication process with the subscriber or caller over the digital ports 74 through the digital switching system 26 and the central office 20 using card driver and other library processes 96. When the application process 94 is to store a facsimile message, the application process 94, through FPU control process 92, MCU interface process 90 and APU interface process 86, requests from the master control process 80 the subscriber information (a user information structure) which defines the characteristics of the subscriber facsimile mailbox (message length, options, etc.). The master control process 80 maintains a directory structure of such files as described in detail in copending application Ser. No. 07/393,270, filed Aug. 10, 1989.

Once the user information structure is obtained by the master control process 80, it is transferred through the APU interface process 86, the MCU interface process 90 and the FPU control process 92 to the appropriate application process 94 and stored in a local cache. Several information structures can be stored in the cache at the same time. By storing the user information structure in the local FPU cache, requests for information from the user information structure can be processed locally without accessing the internal bus 32. The cache for user information is a read only cache and any requests for update are immediately written back, with the updated information being kept in the cache. The cache is emptied at the end of the call, and any request that cannot be serviced by the cache is sent to the MCU.

An outdial process 85 maintains a list of pending outdial requests and a list of when the outdialing needs to be performed. The master control process 80 allocates outdial ports depending on the home application processing unit in order to minimize fax, net plays during fax delivery. When the time arrives for making an outdial (i.e., to send out a fax), the master control process 80 can schedule the request to be performed by the FPU which stores the original facsimile message. The master control process 80 will issue a request to the digital switching system 26 to connect an outgoing line to the appropriate FPU port. The master control process 80 forwards the outdial request through the FPU control process 92 to the appropriate application process 94 to service the request. The master control process 80 also requests that the FPU storing a facsimile message start the application process 94 corresponding to the FPU port designated. Application process 94 requests from the master control process 80 the list of messages, as illustrated in FIG. 16. The application process 80 will then create a doubly linked list as illustrated in FIG. 17. FIGS. 16 and 17 are described in detail in the copending application and this description will not be repeated here. Connection to the remote fax is then carried out in the manner described in FIG. 9 below.

As described in detail in the copending application, a distribution process 95 is used to access a group of designated mailboxes in the system and to create a message entry (voice or fax) for each subscriber referencing the location of the group message. A mailbox process 97 services requests for creation, deletion and the initialization of subscribers. This process creates or removes the subscriber directories and asks for mailbox data from the master control process 80. An MCU save resume process 99 sends a packet over bus 32 to cause an FPU save resume process 101 to be executed. The FPU save resume process 101 can save the state of the application process 94 and transfer it to a different FPU (e.g., FPU N). The save resume process 101 executing on FPU 1 transfers all of the current state to FPU N. This state includes all pertinent data structures such as the doubly linked list illustrated in FIG. 17 and the stack from the application process 94 which contains among other things the thread of execution and values of parameters which are passed between subroutines and the application process 94. An FPU transfer process 103 in FPU N communicates with the application process 94 in FPU 1 to indicate whether the FPU N is available by responding to a message transfer request.

A master control process 98 in standby MCU 40 executes all of the processes that the master control process 80 in the primary MCU 38 executes, so that the master control process 98 is ready to take over processing if the MCU 38 fails. This is accomplished by the master control process 80 sending all requests from other processes to the master control process 98 through an MCU interface process 100. The master control process 98 then performs appropriate processing with the corresponding interface processes inactivated.

During operation, a poll process 102 periodically sends poll requests over the virtual link to the MCU 38. The master control process 80 determines whether each FPU is operating by determining whether a request from the FPU is received every two minutes. The master control process 98 in the standby MCU 40 also periodically checks on the operating state of the primary master control unit 38 This is performed by the master control process 98 requesting that the master control process 80 respond to a poll request every 15 seconds. If the master control process 80 does not respond within a predetermined time period, for example, 30 seconds, a master control process 98 requests that the FPUs $44_1$ to $44_N$ confirm that the primary MCU 38 is malfunctioning. The master control unit 40 places a broadcast message on the internal bus 32 using a message protocol, such as UDP, which is available from Excelan. The message is processed by a master control unit check process 104 of each FPU. The master control unit check process 104 requests that the FPU control process 92 poll the master control process 80 and if a reply is not received within 5 seconds, the virtual link is considered broken. As previously discussed, the MCU interface process 90 is a connect oriented process rather than a message oriented process, and if the connection between the corresponding APU interface process 86 and the MCU interface process 90 has failed, this polling request will recognize this condition. The MCU check process 104 responds to the broadcast request of the master control process 98, based on the response to the FPU control process 92 poll, indicating whether the connection between the FPU and MCU 38 is active. If the master control process 98 receives one indication from any FPU that the primary MCU 38 is functioning properly, the master control process 98 in the standby MCU 40 will not take over operation and will try to re-establish a virtual connection to the MCU 38. If the primary MCU 38 has failed, each of the MCU interface processes 90 in the FPUs has also failed. When master control process 98 asks FPU control process 92 to test the link, if the MCU interface process 90 has terminated because of a failed link, MCU interface process 90 will restart and place a message on the bus 32 every 10 seconds requesting that the active MCU respond indicating that it is in control. The other FPUs perform the same operation. The standby master control process 98, when taking over the operation of the failed MCU, activates its APU interface processes 86 which respond to the request by the MCU interface processes 90, indicating that the standby MCU 40 has taken control. The master control process 98 also activates the standby CO interface process 82. The activation of this process causes switch 42 to switch to send data to the MCU 40. In addition, digital switching system interface process 84 is started. Thus, the standby MCU 40 then becomes the primary. When the MCU 38 come back on line, it determines that the standby unit 40 is active and controlling, and that the MCU 38 is now the standby unit.

During power up initialization, the MCUs 38 and 40 each load the system configuration table designating whether each MCU is a primary and also indicating how many APUs are configured in the system. The primary MCU 38 and standby MCU 40 immediately begin to try to establish a virtual link between the standby master control process 98, MCU interface process 100 and master control process 80. The attempt to establish the link will continue for a predetermined time, for example, 5 minutes. The APUs also start up but do not know which MCU is the primary MCU. As a result, FPU control process 92 begins broadcasting messages on the bus 32 requesting connection to the primary MCU 38. If the primary MCU 38 does not respond to the standby MCU 40 within the predetermined time period previously mentioned, the MCU 40 will start its interface processes and respond to the broadcast messages of the APUs, thereby taking over as the primary. If the configured primary MCU 38 later comes on line, it checks the other MCU 40 and determines that it is running as the primary MCU, and then configures itself as the standby MCU.

As described above, in copending application Ser. No. 07/393,270, filed Aug. 10, 1989, an attached Appendix includes all of the "C" programming language processes or similar processes required for operation of the telephone communication system disclosed in that application. The subject application is directed to an enhancement of such system including a platform for providing services in addition to voice mail. The modifications necessary to the processes of FIG. 4 and a description of the facsimile application process 94 is provided below with reference to the flow diagrams of FIGS. 5-15.

With respect to the master control unit 24, the only modifications necessary to the processes run by the master control unit relate to the master control process 80. That is, when plural information services are to be provided by the system, the system must be capable of recognizing what type of information service is being requested. With respect to the specific example of a facsimile information service, the system will use the SMDI packet to identify the telephone number for which the call was intended. This telephone number is used to determine which mailbox should receive the fax transmission. If the mailbox has exceeded the maximum storage parameters set by the system administrator, the system will play a prompt informing the caller that fax documents cannot be received at the current time.

Figure 5:
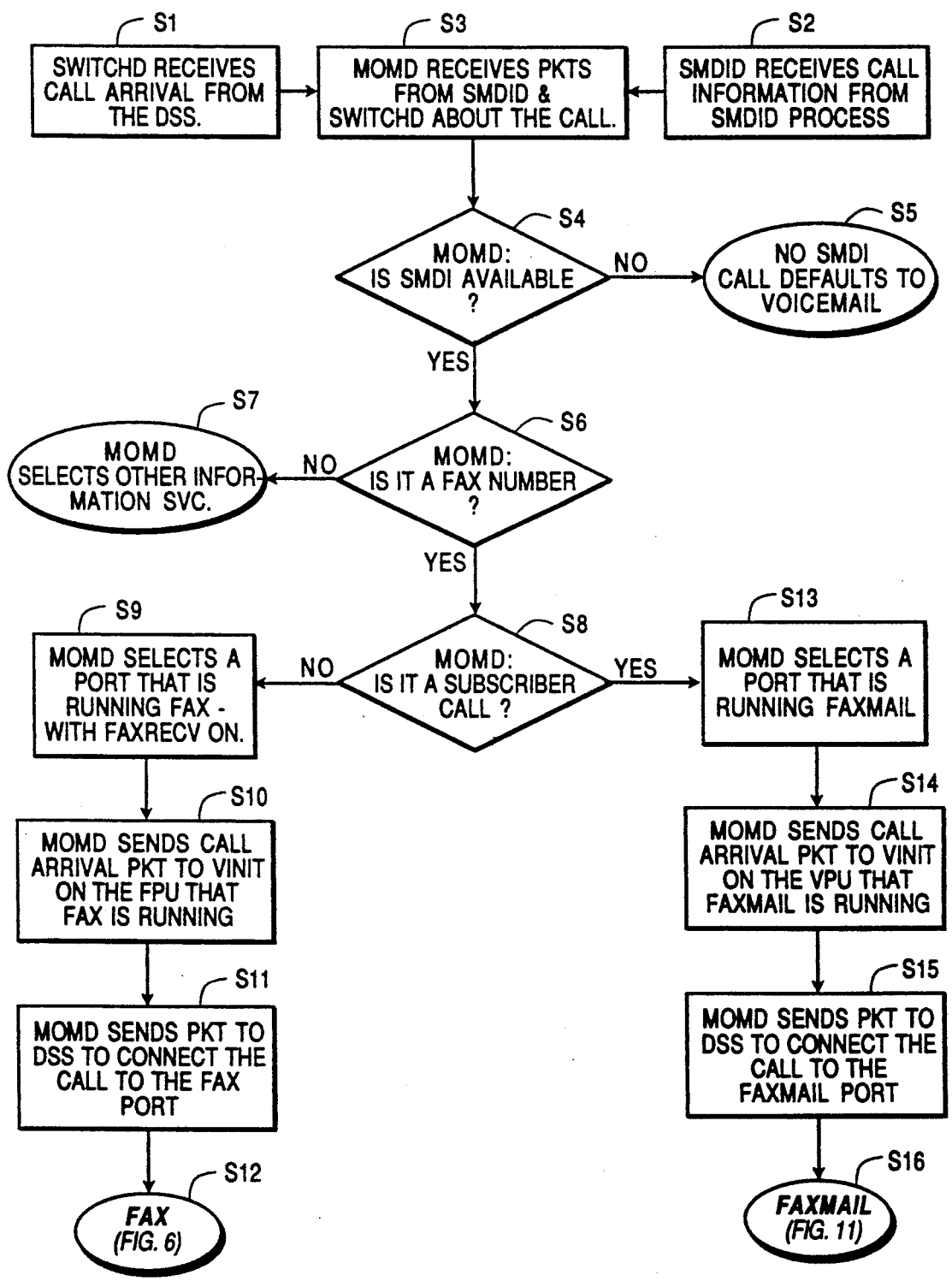
FIG. 5 is a flow diagram for illustrating the modified portion of the program for the master control process 80 which is required to operate plural information services, including a voice mail message service and a facsimile processing service.

Referring to the flow diagram of FIG. 5, modifications to the master control process 80 to provide additional information services, are described. In operation, the DSS interface process 84 receives a call arrival from the digital switching system 26 (S1) and the CO interface process 82 receives call information from the SMDID process (S2). The master control process 80 receives packets from the DSS interface process 84 and the CO interface process 82 concerning the call (S3) and determines whether SMDI is available (S4). If SMDI is not available, then the call is defaulted to a voice mail process, so that a VPU is accessed (S5). If SMDI is available, then the master control process 80 determines whether the called number is a facsimile number (S6). If the called number is not a facsimile number, then the master control process 80 can perform additional steps to detect if another type of information service has been requested (S7). For example, the master control process 80 can include additional procedures for determining whether other services such as a videotex information service, speech synthesis information service, E-mail information service, residential call answering service, voice messaging service, home shopping service, classified advertisement service, trucking dispatch service, doctors register service and automated attendant service, etc. have been requested. While in the above example, the master control process 80 detects that the called number is a facsimile number, when a number of different information services are being provided, the caller can be provided with a voice menu of the available information services so that the caller can select the desired service by pressing the appropriate number. For example, the voice menu could state:

"For voice mail press 1, for videotex press 2, for facsimile press 3, for speech synthesis press 4, for E-mail press 5 . . ."

If the master control process 80 determines that the called number is a fax number in S6, then the master control process 80 determines whether it is a subscriber who is calling (S8). If a non-subscriber (i.e., a fax machine delivering a fax) is calling, then the master control process 80 selects a port of an application processing unit which is capable of running the processes FAX and FAX-RECV (S9). That is, the master control process 80 selects one of the FPUs which is capable of running the process for receiving and storing a facsimile. After the port has been selected, the master control process 80 sends a call arrival packet to the FPU control process 92 on the FPU which has been selected (S10) and sends a packet to the digital switching system 26 to connect the call to the selected fax port 74 (S11). Control is then passed to the application process 94 for running the FAX process (S12) in the manner described below with respect to FIGS. 6–10. If in step 8 it is determined that a subscriber is calling, then the master control process 80 selects a port of a voice processing unit which is capable of running the process FAXMAIL (S13) because a voice interface is needed to guide the subscriber through his or her fax mailbox. The master control process 80 sends a call arrival packet to a VPU control process (which is the same as the FPU control process 92) on the selected VPU (S14) and sends a packet to the digital switching system 26 to connect the call to the selected port (S15). The VPU application process on the selected VPU then runs the FAXMAIL process (S16) in the manner described below with respect to FIGS. 11–15.

Figure 6:
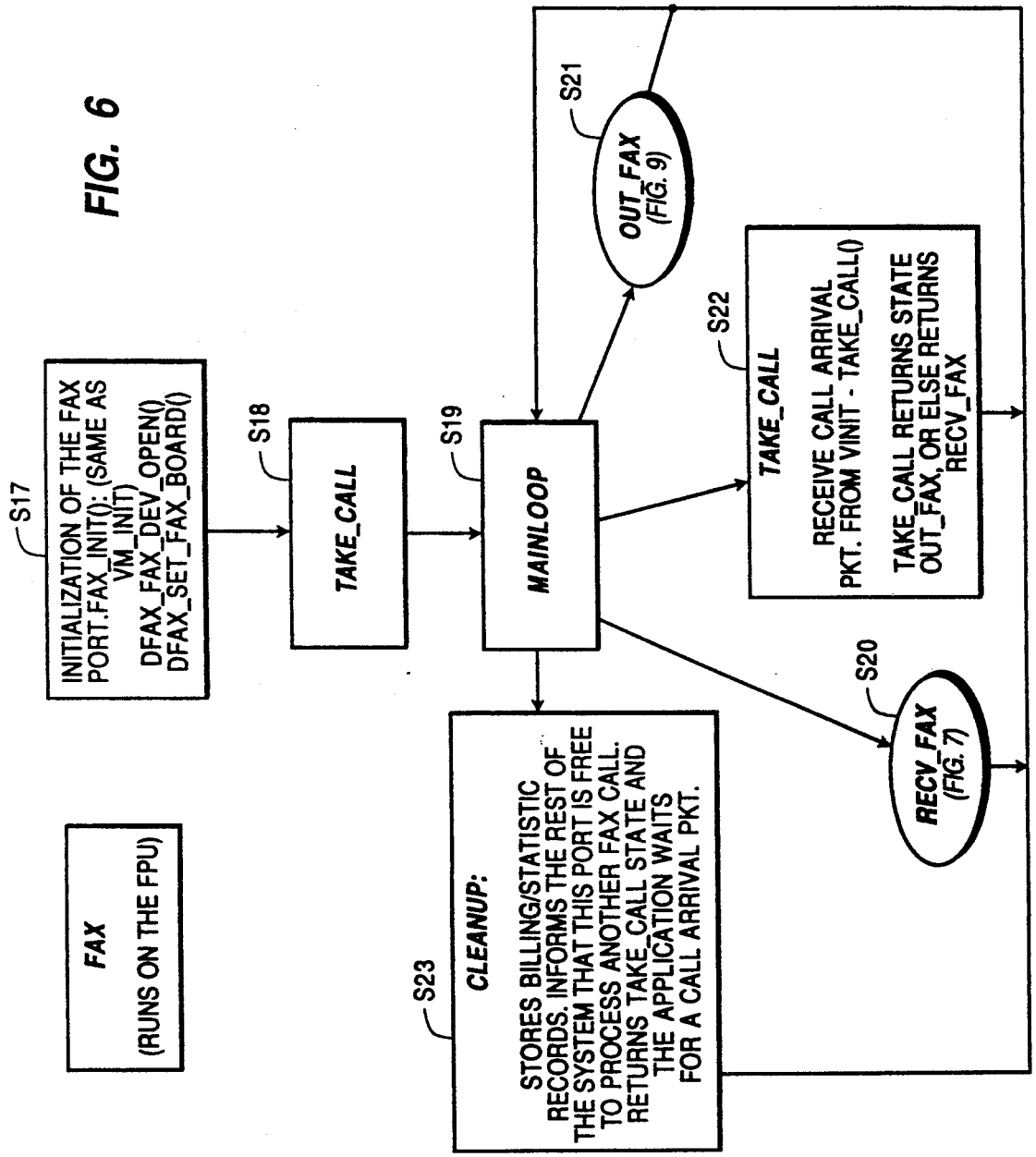
FIG. 6 is a flow diagram for illustrating the FAX process of FIG. 5.

FIG. 6 is a flow diagram for describing the procedures carried out by the application process 94 on the FPU when running the process FAX, which includes the process for receiving and sending faxes. The fax port 74 is initialized, the actual fax device is opened and the fax port is set with a set of parameters (S17). The application process 94 then receives the call arrival packet from the FPU control process 92 (S18) and enters a MAINLOOP (S19) which controls the switching between the various procedures run in the FAX process, including RECV-FAX (S20), OUT-FAX (S21) and TAKE-CALL (S22) which returns the call from OUT-FAX or RECV-FAX. Operation may also be switched from the MAINLOOP S19 to CLEANUP (S23) in which billing and statistical records are stored and the rest of the system is informed that the port is free to process another fax call.

Figure 7:
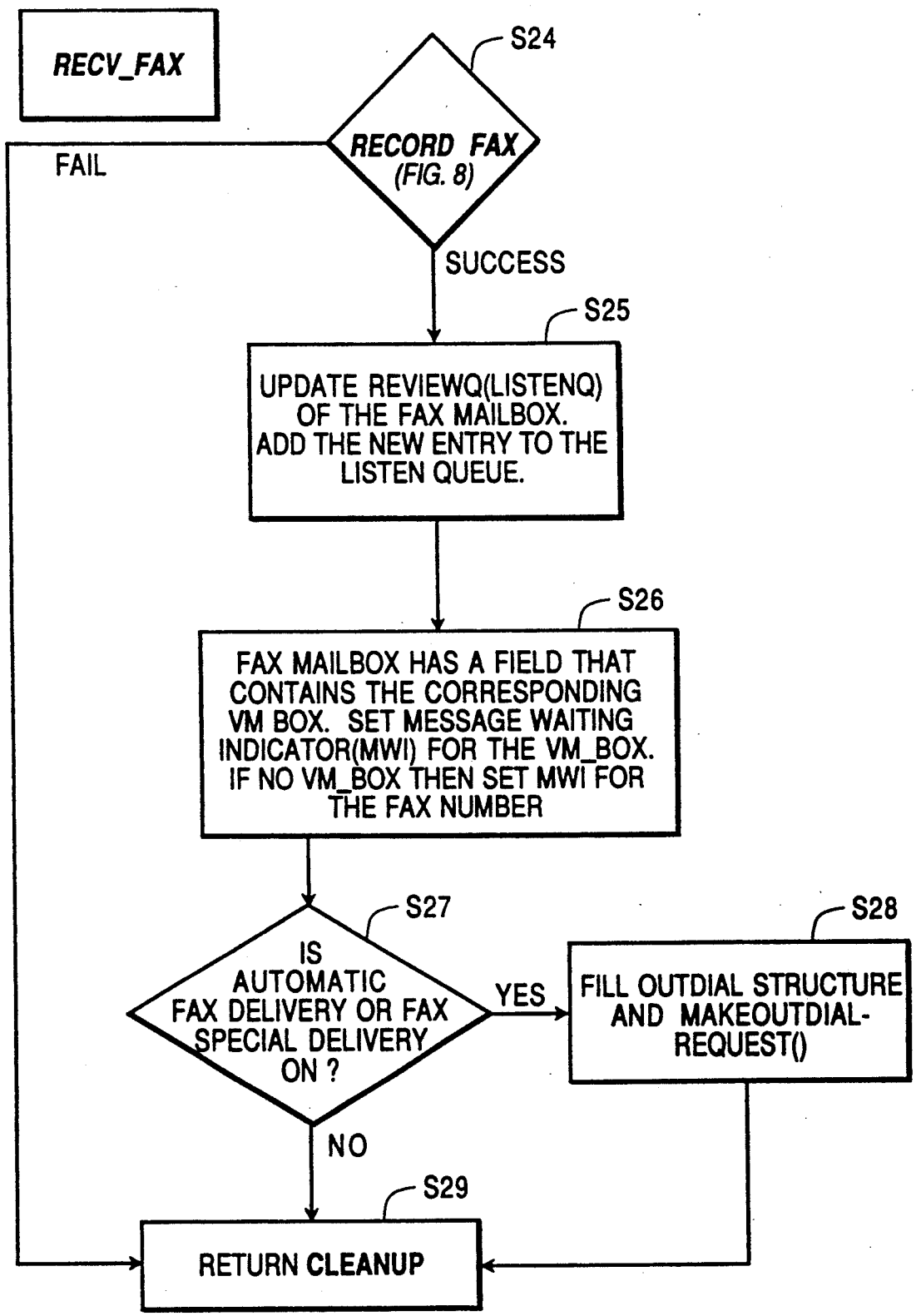
FIG. 7 is a flow diagram for illustrating the RECV-FAX process of FIG. 6.

FIG. 7 is a flow diagram for describing the RECV-FAX portion of the fax process. When the MAINLOOP S19 has switched to the RECV-FAX portion (S20) of the FAX process, the process for recording the fax is performed (S24) and it is determined whether the incoming fax has been successfully recorded. If the incoming fax has failed to be recorded, the process returns to CLEANUP (S23 in FIG. 6). If the facsimile is successfully recorded, then the review or listen queue of stored faxes in the fax mailbox is updated by the new entry (S25), and if the fax mailbox has a field which indicates that a corresponding voice mailbox exists, then a message waiting indicator (e.g., a message lamp or stutter dial tone) is set for the voice mailbox (S26). If there is no corresponding voice mailbox then a message waiting indicator is set for the fax number (S26). In this way, subscribers can be notified that they have received a facsimile document in their mailbox. Subscribers who have separate voice and fax mailboxes will hear a prompt when they log into their voice mailbox notifying them if any new fax documents have been deposited in their fax mailbox. By pressing a single key, they will be able to log into their fax mailbox during the same call session. In addition to the above type of message waiting indication, the system is capable of outdialing to a pager number when fax documents are received. The subscriber can indicate that the pager should be signaled only upon the receipt of documents marked urgent and/or only upon the receipt of documents from a specified sender. With a cascade outdialing feature, up to 10 consecutive pager numbers can be signalled at intervals selected by the system and administrator. After the message waiting indication has been set, it is then determined whether automatic fax delivery or fax special delivery has been requested (S27) and if so, an outdial request is made to the outdial process 85 (S28). After the outdial request, or if no automatic delivery or special delivery has been requested then the process returns to CLEANUP (S29).

Figure 8:
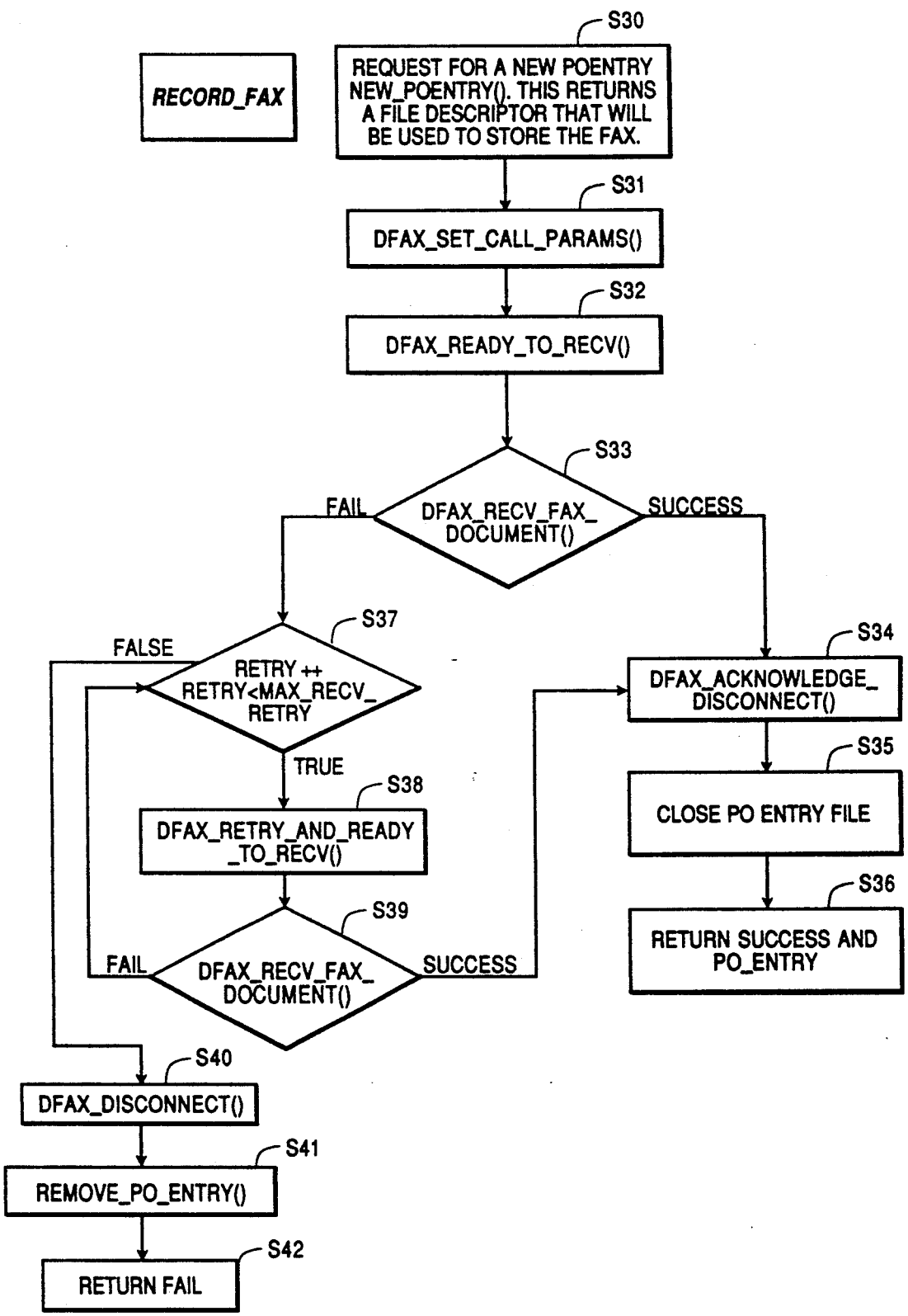
FIG. 8 is a flow diagram for illustrating the RECORD-FAX procedure of FIG. 7.

FIG. 8 is a flow diagram for describing the RECORD-FAX process which is S24 in FIG. 7. The RECORD-FAX process operates a device driver based on the manufacturer's specifications for the facsimile board 74. Thus, RECORD-FAX includes library processes 96 which define an interface to the device driver. A request for a new post office entry is made and a file descriptor that will be used to store the fax is returned (S30). The post office file is a collection of files for identifying where fax data is stored. Then, the call specific parameters to an open fax device are set (S31), and the FPU is notified of a received request (S32). The FPU receives a fax from the calling remote fax machine, and all fax pages are stored into one file which is passed from the application as an argument to this function. An end of page (EOP) indication from the remote fax machine requires special characters to be appended to the fax file (S33). If the fax is successfully received, an acknowledgement will be received when the remote fax machine and the fax device have both terminated the call session (S34). Then, the post office entry file is closed (S35) and an indication that the fax has been successfully received is generated (S36). Operation then proceeds to S25 in FIG. 7.

If there is a failure to receive the fax document, transmission is retried up to a preset number of times (S37 and S38) and it is detected whether the fax document is successfully received, in a manner analogous to S33 (S39). If the fax document is successfully received, then flow proceeds to S34. If after the predetermined number of retries, there is still a failure to receive the fax, then the call is disconnected to terminate any in progress message with an end of page indication and initiate phase E of the T.30 protocol by sending a disconnect message (S40). Then, the post office entry is removed (S41) and an indication that the fax has not been received is returned (S42), so that flow continues to S29 in FIG. 7.

Figure 9:
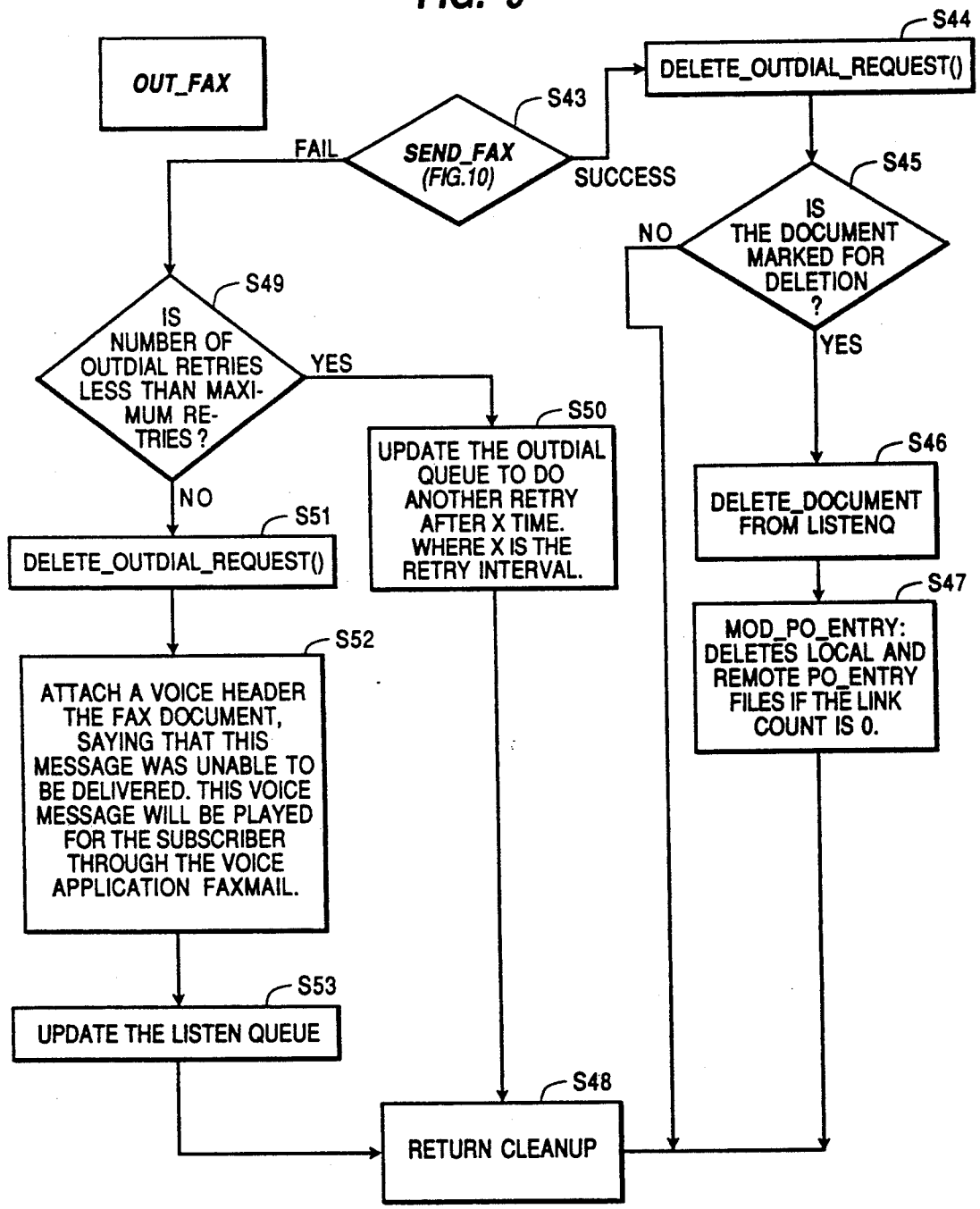
FIG. 9 is a flow diagram for illustrating the OUT-FAX process of FIG. 6.

FIG. 9 is a flow chart of the OUT-FAX portion (S21) of the FAX process of FIG. 6. This procedure is called when a fax is to be sent to a fax machine designated by a subscriber. The procedure SEND-FAX (S43) makes an outdial request to the outdial process 85, transmits a stored fax document, and determines whether the fax has been successfully sent. In particular, the outdial process 85 initiates a request to make an outdial and the master control process 80 selects the fax port for the home FPU for the fax mailbox. The master control process 80 requests the DSS interface process 84 to connect to the selected FPU port and notifies the fax port to handle the outdial. Thereafter, the DSS interface process 84 sends a request to the digital switching system 26 and the FAXOUT process seizes the line. If the fax has been successfully transmitted, then the outdial request is deleted (S44) and it is determined whether the document which has been sent is marked for deletion (S45). If the document has been marked for deletion then the document is deleted from the review queue (S46) and the post office entry files are modified to be deleted (S47) followed by a return to CLEANUP (S48) which corresponds to S23 in FIG. 6. If the document is not marked for deletion, then the procedure simply returns to CLEANUP (S48). If there was a failure to transmit the fax in S43, then a determination is made as to whether the number of outdial retries is less than the maximum number of retries (S49) and if so, then the outdial queue is updated to perform another retry after a specified time interval has passed (S50), after which the process is returned to CLEANUP (S48). If the number of outdial retries is not less than the maximum number of retries, then the outdial request is deleted (S51) and a voice header is attached to the fax document to state that the message was unable to be delivered. The voice message will be played for the subscriber through the FAXMAIL process performed by one of the VPUs (S52) when the subscriber calls in to pick up his or her faxes. Then, the review queue is updated (S53) and the process is returned to CLEANUP (S48).

Figure 10:
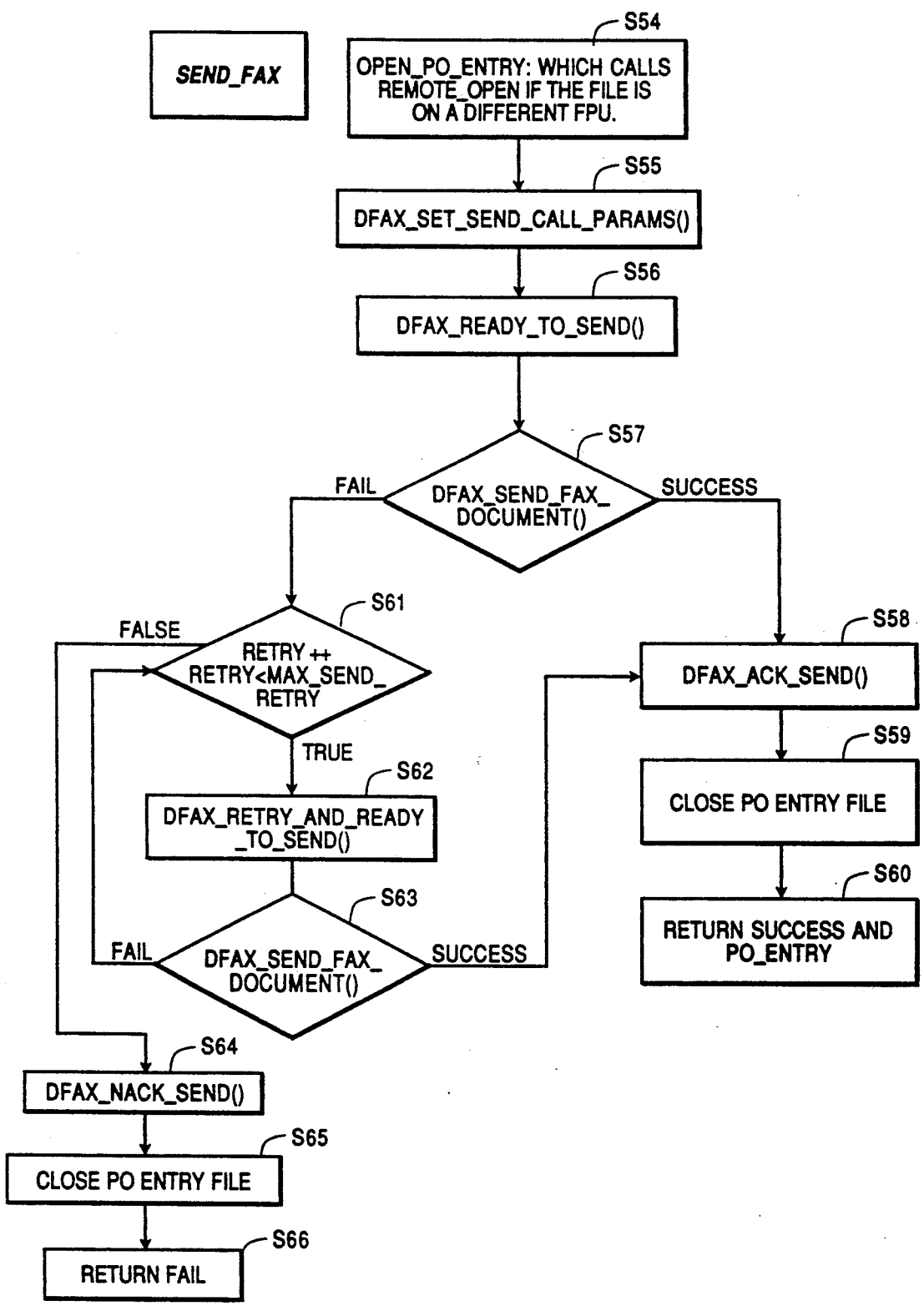
FIG. 10 is a flow diagram for illustrating the SEND-FAX procedure of FIG. 9.

FIG. 10 is a flow chart for the SEND-FAX procedure (S43 in FIG. 9) which operates in a manner analogous to the RECORD-FAX procedure of FIG. 8. In the SEND-FAX procedure, the post office entry is opened which results in calling a remote fax file open if the file is on a different FPU then the FPU to which the subscriber (S54) was directed upon calling in for his or her faxes. The call specific parameters to an opened FPU ar set (S55) and the FPU is notified of a fax send request (S56). The fax file which has been passed will be transmitted to the remote FPU (S57) and there is the ability to manipulate header passages and cover pages. Each page that is sent will be appended with an end of page message. As an alternative, it is also possible for the FPU to generate a fax cover sheet having, for example, the subscriber's name and/or logo to be placed at the front of each fax. If the fax document is successfully sent, then an acknowledgement will be received from the external fax machine (S58), the post office entry file will be closed (S59) and an indication of a successful fax transmission will be sent (S60). If the attempted fax transmission fails, then transmission will be retried for a predetermined number of times (S61 and S62) and if the fax is successfully sent (S63) then flow shifts to S58.

The system administrator can configure the system to attempt transmission a set number of times, at set intervals, upon reaching a busy or no answer condition. The system administrator can set different retry schedules, depending on whether the system encounters a busy or a no answer condition. The retry schedules can contain varying intervals. For example, the system administrator could establish a class of service with the following retry schedules: on a busy condition, the system will retry 5 times at 10 minute intervals; then retry 5 times at 2 hour intervals; and on a no answer condition, the system will retry 5 times at 2 hour intervals. If the fax transmission fails after the predetermined number of retry times, then an indication that no fax has been sent is generated (S64), the post office entry file is closed (S65) and an indication that the process has failed is returned (S66). Subscribers can receive confirmation of documents which are successfully delivered to a mailbox or a remote fax machine. In addition, subscribers will be notified when documents cannot be delivered to a mailbox or a fax machine, and they will be informed of the reason for nondelivery.

Figure 11:
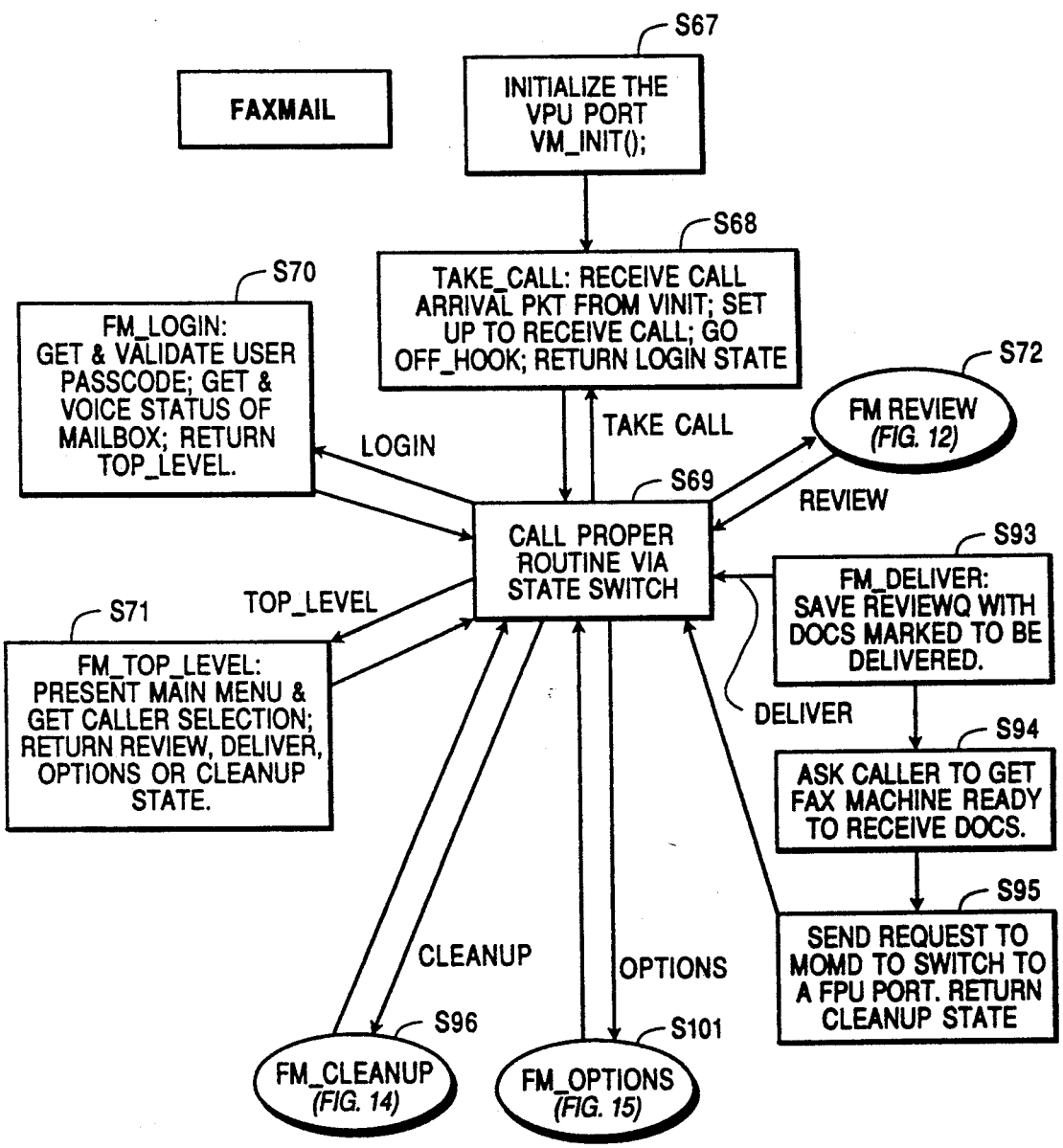
FIG. 11 is a flow diagram for illustrating the FAX-MAIL process of FIG. 5.

FIG. 11 is a flow diagram illustrating the basic flow of the procedures forming the FAXMAIL process (S16 of FIG. 5). The FAX MAIL process is run as a modification to the voice mail application process which is run on the VPUs and which corresponds to the application processes 94 in FIG. 4. The basic voice mail application process which is described in detail in copending application Ser. No. 07/393,270, filed Aug. 10, 1989, is modified to accommodate subscriber access to the subscriber's fax mailbox in the manner described below. In the FAXMAIL process, the VPU port is initialized (S67) and the call arrival packet is received from the voice processing unit control process in the voice processing unit (S68). In addition, the system is set up to receive a call. A state switch operates to call the appropriate routine each time control is returned to the state switch (S69). After a call has been received, the user's passcode is validated and the status of the subscriber's mailbox is obtained (S70). Then, a menu is presented to the subscriber caller and the caller makes a selection from the available menu as to which routine is to be performed (S71). Typically, the subscriber caller will ask to review the faxes in the caller's fax mailbox and the process will proceed to the faxmail review procedure (S72). At any time, the subscriber can press the zero key to receive more information on the currently available menu options.

Figure 12:
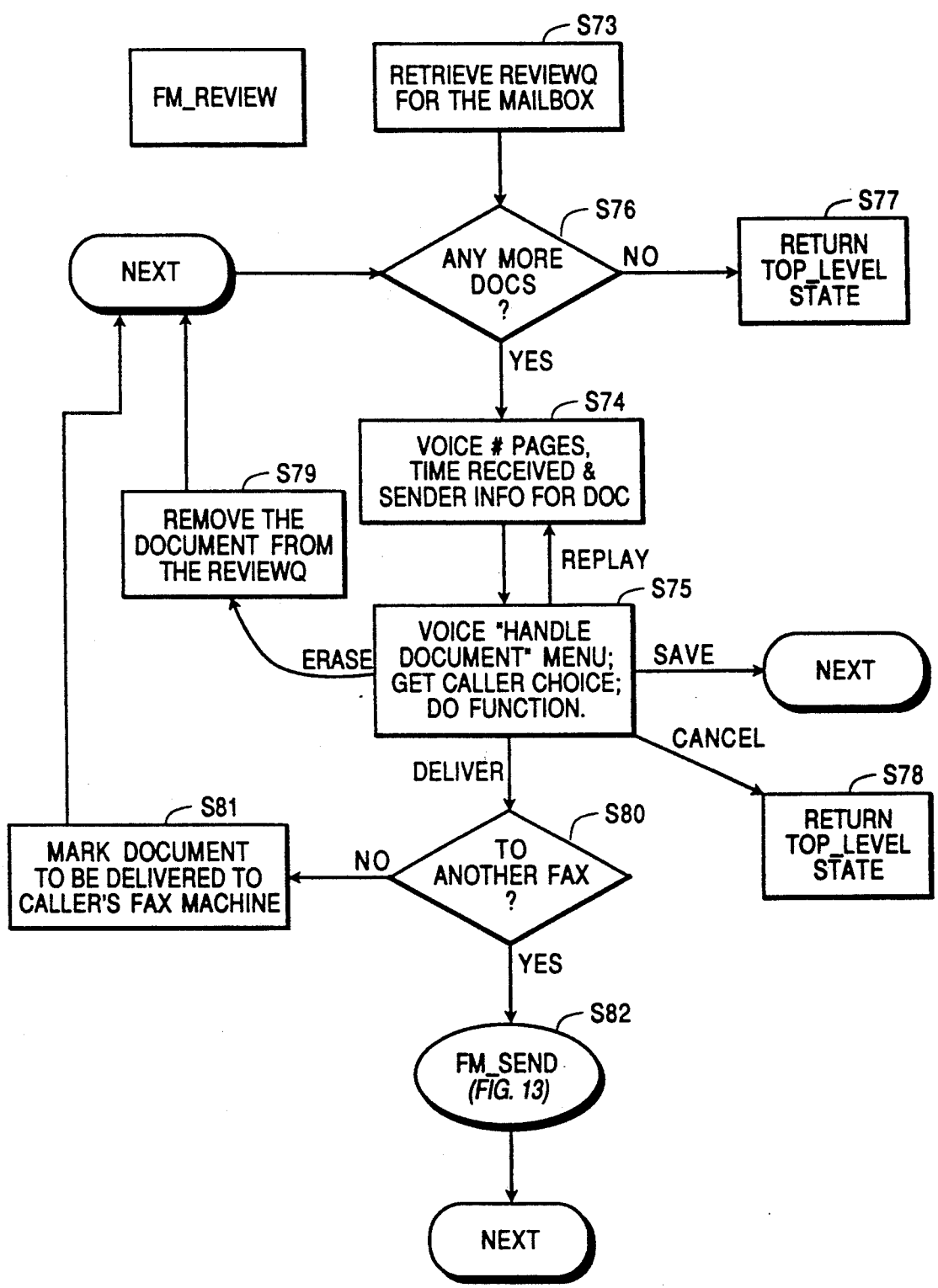
FIG. 12 is a flow diagram for illustrating the fm-review procedure of FIG. 11.

FIG. 12 is a flow chart illustrating the faxmail review procedure. The headers describing the facsimile documents which are in the facsimile mailbox are retrieved (S73) and if a document exists, then a voice message indicating the number of pages, the time the fax was received and the sender information for the document is played for the subscriber caller (S74). For example, the system would play the following type of message:

"'you have three new and one saved fax documents; first document, a 4-page fax document, forwarded at 4:37 p.m. because your fax machine was busy."

The subscriber call is then provided with a "handle document" menu which gives the caller the choice of replaying the voice message, saving the document, cancelling the document, erasing the document or delivering the document to a facsimile machine (S75). If the document is saved, then the system proceeds to determine if there are any additional documents (S76) and if not, the process returns to the main FAXMAIL process (S77) where the caller is presented with a main menu to provide the caller with an additional selection of options (see S71 in FIG. 11(. If the document is cancelled, the process also returns to the main FAXMAIL process to provide the caller with the main menu to provide another selection (S78). If the subscriber decides to erase the document, the document is removed from the review queue (S79) and flow then proceeds to S76 to determine whether there any more documents. If the caller has elected to deliver the facsimile to a fax machine, it is determined whether the delivery is to be made to the caller's fax machine or to another fax (S80). If the document is to be delivered to the caller's fax machine, the document is marked accordingly (S81), and if there are no additional documents, then the system returns to the main menu. If it is determined that the document is to be sent to a fax machine other than the caller's fax machine, then a facsimile send procedure is performed (S82).

Figure 13:
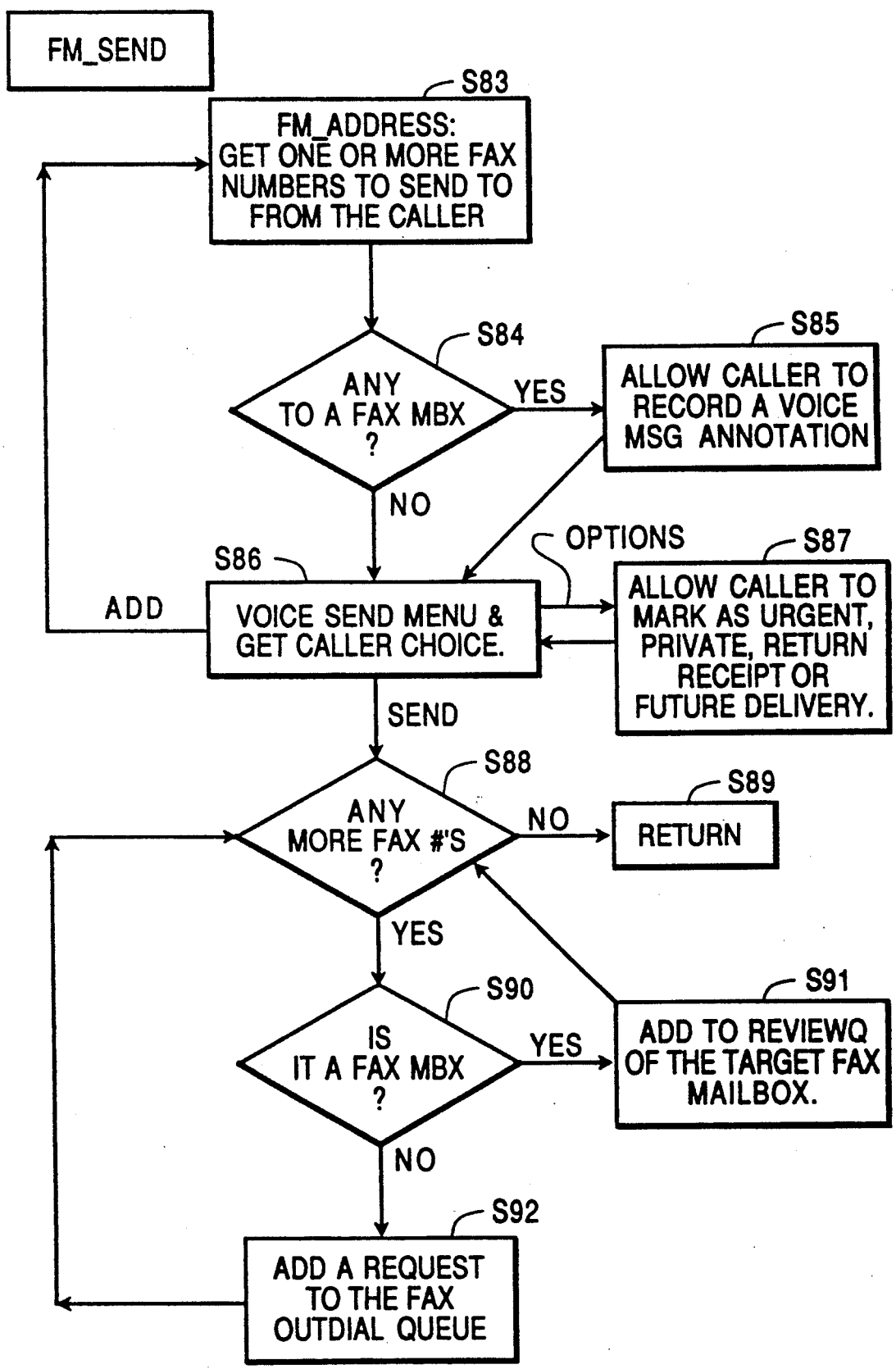
FIG. 13 is a flow diagram for illustrating the fm-send procedure of FIG. 12.

FIG. 13 is a flow diagram for illustrating the predures of the facsimile send module. One or more fax numbers to which the fax is to e sent are received from the caller (S83) and it is determined whether any of the designated numbers is a fax mailbox (S84). In this regard, it should be noted that the subscriber is capable of redirecting a fax to a group of mailboxes. Fax documents sent to more than one mailbox will be stored as a single document, and therefore they do not require additional disk storage space. Subscribers will also be able to broadcast facsimile documents to a group of non-subscribers' fax telephone numbers. Subscribers will be able to create, edit and store a group distribution list that contain both mailboxes and non-subscriber's fax telephone numbers.

If the caller has designated a fax mailbox, the caller is allowed to record a voice message annotation to be used as part of the voice header for the fax (S85). For example, the system header may state:
"third document, a one page fax document, sent from manufacturing department fax mailbox at 1:24 p.m. yesterday."
and the attached voice message might be as follows:

"High, it is Rupert. Here is the fax of my rhubarb pie recipe."

If the designated fax numbers are not for a fax mailbox or after the caller has provided a voice message annotation (S85), then a voice menu provides the caller with a choice of adding additional fax numbers, having the fax sent or selecting other options (S86). Under the options scenario, the caller is allowed to mark the facsimile as urgent, private, return receipt requested, or for future delivery (S87). When the fax is marked "urgent", when the subscriber logs into their mailbox they are notified if they have received any urgent documents, and urgent documents are placed at the head of the document queue. During the transmission or same-call retrieval of multiple documents, urgent documents will be transmitted first. Those faxes marked "private" will have the automatic delivery feature overridden, so that these documents will be stored in the recipient's mailbox until they are retrieved.

The return receipt requested marking will mean that the subscriber will be notified when a document is successfully delivered to a mailbox. Documents marked "feature delivery" can be transmitted at a schedule of delay transmission up to a year in advance. When the caller elects to have the facsimile sent, then it is determined whether there are any more fax numbers (S88) and if not, control reverts to the facsimile review module of FIG. 12 (S89). If there are more fax numbers then it is again determined whether the newly designated fax numbers are fax mailbox numbers (S90) and if so then these numbers are added to the review queue of the target fax mailbox (S91). If the fax number is not for a fax mailbox then a request is added to the fax outdial queue (S92). After all fax numbers have been exhausted then control is returned to the facsimile review module (FIG. 12). After the facsimile review procedure (FIG. 12) has been completed and the FAXMAIL process (FIG. 11) returns to the TOP-LEVEL state (S71), the subscriber will typically select the deliver option in which the review queue with the documents marked to be delivered is saved (S93). The caller is then asked to get the fax machine ready to receive documents (S94) and a request is sent to the master control process 80 to switch to an FPU port to have the specified facsimile delivered (S95). The FAXMAIL process is then returned to the facsimile cleanup module (S96 in FIG. 11).

Figure 14:
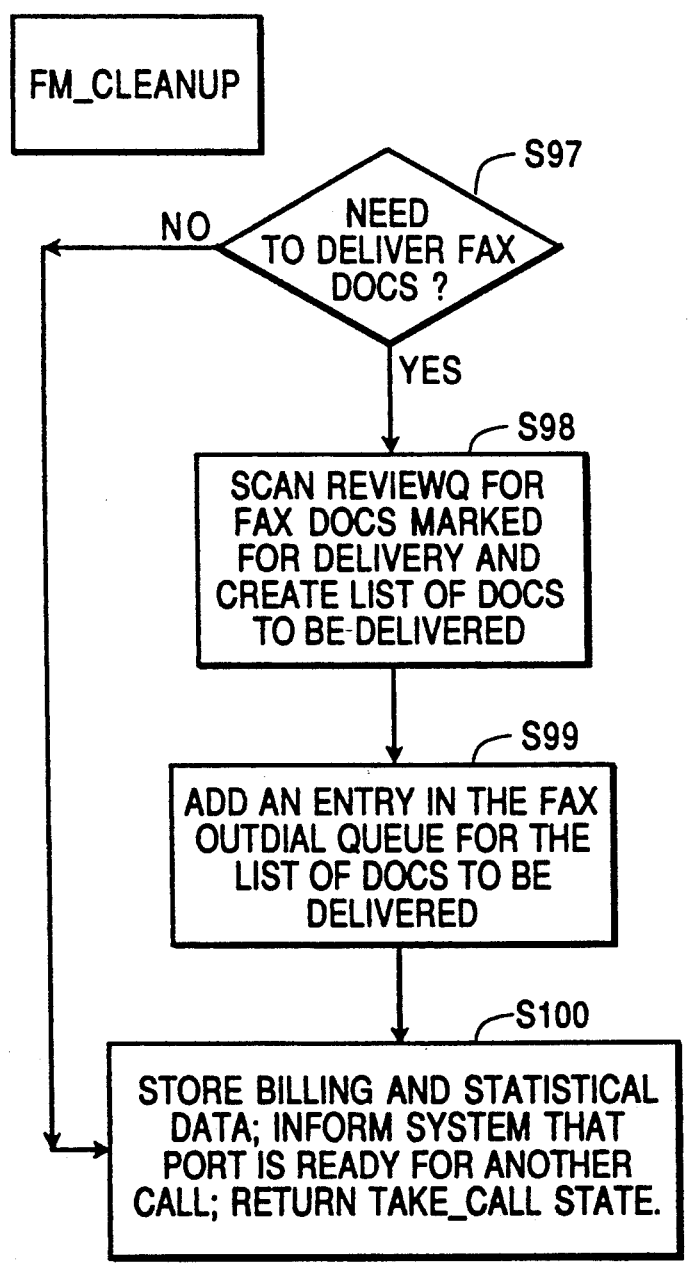
FIG. 14 is a flow diagram for illustrating the fm-cleanup procedure of FIG. 11.

The facsimile cleanup module is illustrated in detail by the flow diagram of FIG. 14. It is determined whether there is a need to deliver facsimile documents (S97) and if so, the review queue is scanned for fax documents marked for delivery and a list of documents to be delivered is created (S98). If multiple documents are to be sent to the same fax machine (e.g., the first and third documents in the queue are to be sent to the subscriber's home phone), then the system automatically combines the documents and transmits them as one document in a single call. An entry is added in the fax outdial queue for the list of documents to be delivered (S99). If there is no need to deliver additional fax documents or after the list of documents to be delivered has been added as an entry in the fax outdial queue then billing and statistical data is stored and the system is informed that the port is ready for another call (S100). The FAXMAIL process then returns to the take call state.

Figure 15:
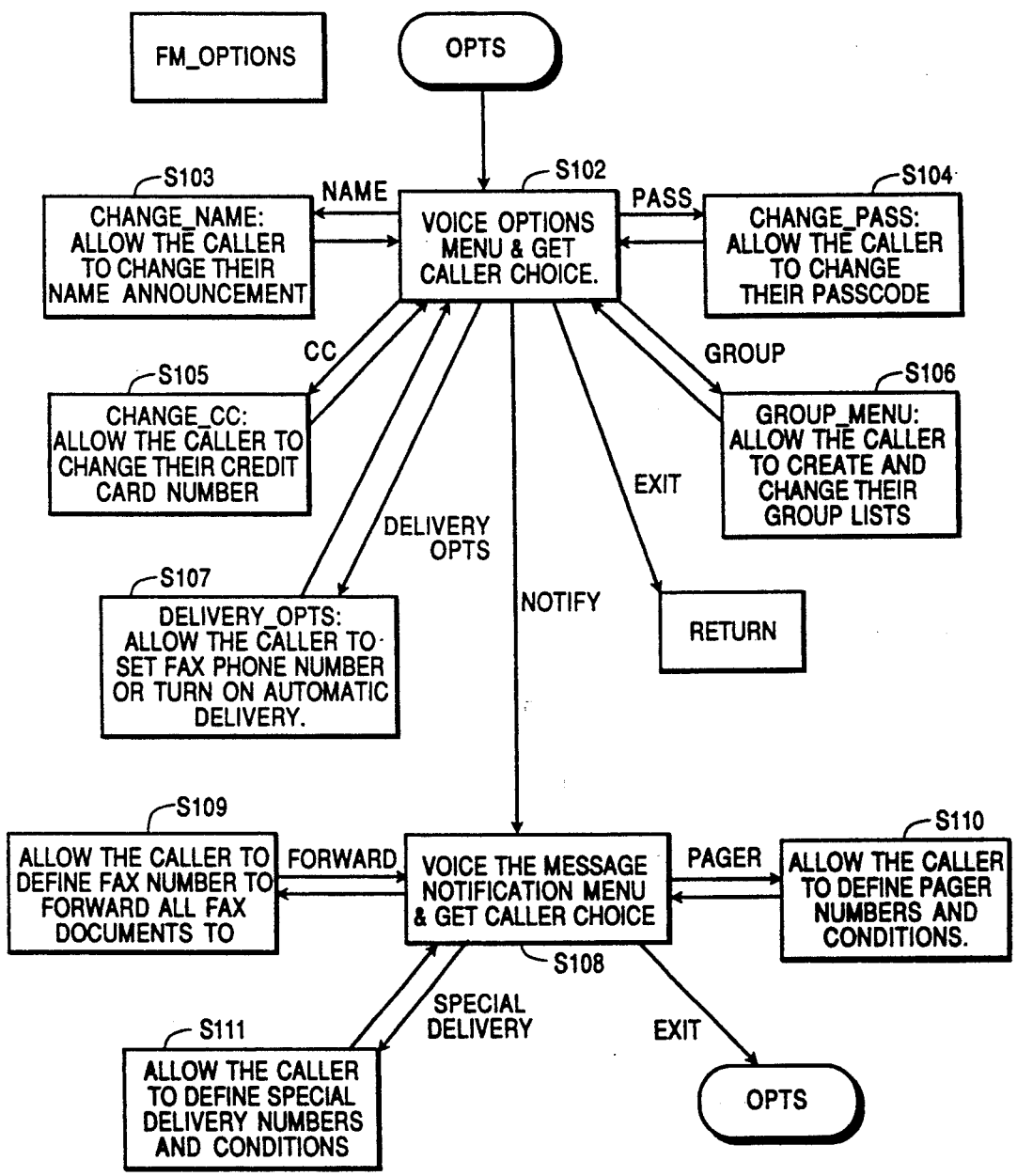
FIG. 15 is a flow diagram for illustrating the fm-options procedure of FIG. 11.

The remaining module illustrated in FIG. 11 is the facsimile options module (S101) which is illustrated in detail by the flow chart of FIG. 15. In this module, the caller is given a choice of a number of options by way of a menu (S102). Depending on the selection by the caller, the caller is allowed to change the name announcement with respect to their mailbox (S103), to change their passcode (S104), to change their credit card (i.e., calling card) number (S105), to change and create group lists (S106) and to set a fax phone number or to turn on an automatic delivery option (S107). Under the "notify" option, the caller is provided with a message notification menu which allows the caller to make additional choices (S108). Under this option, the caller can define a fax number to which all fax documents should be forwarded (S109), and the caller is allowed to define pager numbers and conditions (S110). Under a special delivery option, the caller is allowed to define special delivery numbers and conditions (S111). After the caller has completed selection of the options, control is returned to the state switch (S69 of FIG. 11).

Based on the above detailed description, it would be a relatively simple task for one of ordinary skill to implement an E-mail applications processing unit. This can be achieved by modifying the applications processing unit (e.g., a VPU or an FPU to include a modem card having E-mail ports. For example, the Sportster 2400 model modem card sold by U.S. Robotics of Skokie, Illinois may be used to implement the E-mail function. Thus, it can be seen that the integrated services platform could readily be provided with voice mail, facsimile and E-mail information services on a single platform.

Although a particular implementation of the present invention has been described in detail, it is noted that there are numerous modifications which may be made to the subject invention. For example, while individual processes have been illustrated as running on either the MCU or one of the APUs, such processes may be shifted and centralized if desired. In addition, while the above description describes providing a single service during a particular call, the use of voice menus would allow a caller to request several different types of service during a single call in series. Further, while the present invention is primarily directed to an integrated services platform for providing plural information services on a single system, the facsimile information service system described in detail above can of course be implemented as a stand alone process.

In the integrated services platform illustrated in FIG. 1, the use of Bellcore or CCITT standard protocols and links is preferred for communication with the central office 20. The central office based voice and data processing platform should be able to gather call-routing information through a variety of different communication mechanisms such as simplified message desk interface (SMDI) and dialed number identification service. The platform can provide multiple SMDI/SMSI links for centralized installation of the platform and resource sharing among end switches. By using an SMDI concentrator, voice and data traffic for many central offices can be handled by a single platform. In the future, it may also be mandatory for the platform to gather routing information via signalling system 7.

The integrated services platform is adapted to be operated in a manner consistent with the voice mail interface described in the copending application. Thus, the integrated services platform will comply with the national standard user interface developed by the Voice Mail User Interface Form (VMUIF/IIA).

As described above, it is desirable that billing information should be available from the platform in automatic message accounting format on nine-track magnetic tapes or via real-time teleprocessing. The billing information can include the date, time, duration and transaction type of all significant events associated with each account.

An engineering and administrative data acquisition system is the route through which the telephone companies can gather engineering and administrative data from the applications platform. This data typically includes summary data by class of service, voice storage usage, processor use and traffic data. It should be possible for computers that are located in the central office to poll the platform for this data. Traffic engineering, network administration and product line management should be able to request reports that are generated from the data.

Complete and detailed alarming capabilities ar preferred for maintenance of the integrated services platform. The platform should conform to alarm notification standards with complete information, including the system identification, date, time, alarm level (minor, major or critical), and a description of the source of the alarm.

The single platform should be able to support multiple central offices so that telephone companies can capitalize on economies of scale and administrative advantages. Telephone companies should be able to load-share business and residential users who may have different peak usage times. If a variety of applications with different peak usage times run on the platform, the hardware will be more cost effective. Running all of the applications and including a large number of subscribers on the same platform has significant statistical advantages. For example, one of the most valuable features of a large system is central maintenance and administration.

In the integrated services platform in accordance with the present invention, growth can be enhanced by using several modular application processors tied together into a tightly coupled distributed communication environment. For example, a voice processing unit can manage all voice messaging functions within a system, including the digitization of messages, storage of messages on a hard disk and management of subscriber voice mailboxes. A facsimile processing unit can manage all fax processing functions within the system, including sending and receiving faxes, translating from ASCII text files to fax format, converting fax images to text so that they can be delivered via an electronic mail interface or sent to a speech synthesis unit so the fax can be dictated over a phone line, and sending group distribution faxes. As a particular application becomes more popular, the service provider should be able to scale up easily and economically by augmenting the platform with specialized processing units.

The integrated services platform in accordance with the present invention has software and hardware mechanisms that allow for dynamic loading of a variety of applications. Callers are able to access services such as voice messaging, fax store-and-forward, call answering, call delivery, emergency alert and pay phone messaging on the same platform. In addition, the platform is capable of handling audiotex and videotex, which in turn means that services such as banking-by-phone, entertainment, real-time information retrieval, order processing, account inquiry, airline reservations and other applications that will be offered by enhanced service providers in the future will be available.

The connection of the integrated services platform to adjacent information repositories such as main frame and minicomputers that hold financial and credit data for banks, reservation and flight data for airlines, or student and curriculum data for universities, allows the platform to provide the necessary resources to perform the specific service.

A key advantage of using a large integrated platform is that regulated and unregulated divisions of the telephone company can share the equipment. One company subsidiary, on either the regulated or unregulated side, will be designated as the host. For example, if an unregulated subsidiary of a Bell operating company owns and operates an enhanced services platform that supports voice mail, other Bell units, regulated or otherwise, can lease mailboxes to provide their own services.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. An information communication system for providing a requested information service, comprising:
   processing means for providing a first information service to a user via at least two first service processing ports and a second information service to a user via at least two second service processing ports, the first and second information services being different types of services;
   digital switching means for connecting the user to a selected one of said at least two first service processing ports and said at least two second service processing ports; and
   control means for selecting an available one of said at least two first service processing ports and said at least two second service processing ports in response to the requested information service, and causing said digital switching means to connect the user to the selected one of said at least two first service processing ports and said at least two second service processing ports to provide the requested information service.

2. An information communication system set forth in claim 1, wherein the first information service is an audio information service and wherein the second information service is a data information service.

3. An information communication system as set forth in claim 2, wherein:
   said at least two first processing ports comprise voice processing ports and the first information service is a voice mail service, and
   said at least two second service processing ports comprise facsimile processing ports and the second information service is a facsimile service.

4. An information communication system as set forth in claim 1, wherein:
   said at least two first processing ports comprise voice processing ports and the first information service is a voice mail service, and
   said at least two second processing ports comprise facsimile processing ports and the second information service is a facsimile service.

5. A system as set forth in claim 1, wherein:
   said digital switching means comprises means for routing information to one of said at least two first service processing ports and said at least two second service processing ports; and
   said control means comprises means for controlling the routing by said digital switching means.

6. An information communication system, comprising:
   at least two first application processing units for providing a first type of information service to a user;
   at least two second application processing units for providing a second type of information service to a user, the first and second types of information services being different from one another;
   digital switching means for connecting the user to a selected one of said at least two first application processing units and said at least two second application processing units; and
   means for selecting an available one of said at least two first application processing units and said at least two second application processing units in response to the requested information service, and for causing said digital switching means to connect the user to the selected one of said at least two first application processing units and said at least two second application processing units to provide the requested information service.

7. An information communication system as set forth in claim 6, wherein the first type of information services is an audio information service and the second type of information service is a data information service.

8. An information communication system as set forth in claim 7, wherein:
   said at least two first application processing units comprise voice processing units and the first type of information service is a voice mail service, and
   said at least two second application processing units comprise units and the second type of information service is a facsimile service.

9. An information communication system as set forth in claim 6, wherein:
   said at least two first application processing units comprise voice processing units and the first type of information service is a voice mail service, and
   said at least two second application processing units comprise facsimile processing units and the second type of information service is a facsimile service.

10. An information service processing method using a digital switching system, at least two first application processing ports coupled to the digital switching system for providing a first type of information service, and at least two second application processing ports coupled to the switching system for providing a second type of information service, comprising the steps of:
   a) selecting an available one of the at least two first application processing ports and the at least two second application processing ports in response to a call;
   b) controlling the digital switching system to route the information to the selected one of the at least two first application processing ports and the at least tow second application processing ports; and
   c) processing the call through the selected one of the at least two first application processing ports and the at least two second application processing ports to provide the requested information.

11. An information service processing method according to claim 10, wherein said step (a) includes determining the type of information being requested by the call.

12. An information service processing method according to claim 11, wherein said determining step includes determining whether the call has requested an audio information service or a data information service.

13. An information service processing method according to claim 12, wherein said determining step comprises detecting whether the requested information service is a voice mail message service or a facsimile processing service.

14. An information service processing method according to claim 10, wherein said step (a) includes automatically detecting whether the call is from a facsimile machine and selecting an available one of the at least two first application processing ports if the call if from a facsimile machine.

15. An information service processing method according to claim 14, wherein said step (c) includes storing the facsimile received from the facsimile machine and confirming receipt of the facsimile.

16. An information service processing method according to claim 10, wherein said step (c) includes:
   (c1) attempting to store the facsimile received from the facsimile machine; and
   (c2) reattempting to store the facsimile received from the facsimile machine up to a predetermined number of times if there is a failure to store the facsimile in said substep (c1).

17. An information service processing method according to claim 14, wherein said step (c) includes substeps of:
   (c1) attempting to transmit a restored facsimile to a specified facsimile machine; and
   (c2) reattempting to transmit the stored facsimile up to a predetermined number of times if there is a failure to transmit the facsimile in said substep (c1).

18. An information communication system for providing a requested information service, comprising:
   processing means for providing a first information service to a user via at least two first service processing ports, a second information service to a user via at least two second service processing ports, and a third information service to a user via at least two third service processing ports, the first, second and third information services being different types of services;
   digital switching means for connecting the user to a selected one of said at least two first service processing ports, said at least two second service processing ports and said at least two third service processing ports; and
   control means for selecting one of said at least two first service processing ports, said at least two second service processing ports and said at least two third service processing ports in response to the requested information service and causing said digital switching means to connect the user to the selected one of said at least two first service processing ports, said at least two second service processing ports and said at least two third processing ports to provide the requested information service.

19. An information communication system as set forth in claim 18, wherein:
   said at least two first service processing ports comprise voice processing ports and the first information service is a voice mail service;
   said at least two second service processing ports comprise facsimile processing ports and the second information service is a facsimile service, and
   said at least two third service processing ports comprise E-mail processing ports and the third information service is an E-mail service.

* * * * *